US011801816B2

United States Patent
Sun et al.

(10) Patent No.: US 11,801,816 B2
(45) Date of Patent: Oct. 31, 2023

(54) AIR BRAKE ELECTRIC CONTROL VALVE

(71) Applicant: Automotive Research & Testing Center, Changhua County (TW)

(72) Inventors: Fu-Hsien Sun, Changhua County (TW); Chien-An Chen, Changhua County (TW); Ming-Jyun Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 154 days.

(21) Appl. No.: 17/551,625

(22) Filed: Dec. 15, 2021

(65) Prior Publication Data
US 2023/0182705 A1 Jun. 15, 2023

(51) Int. Cl.
*F16K 11/24* (2006.01)
*B60T 13/68* (2006.01)
*B60T 15/02* (2006.01)

(52) U.S. Cl.
CPC .......... *B60T 13/683* (2013.01); *B60T 15/027* (2013.01); *F16K 11/24* (2013.01)

(58) Field of Classification Search
CPC ..... Y10T 137/86815; Y10T 137/86879; F16K 11/24; B60T 13/683; B60T 15/027; B60T 15/041; B60T 15/04
See application file for complete search history.

(56) References Cited

U.S. PATENT DOCUMENTS

| 4,057,300 | A | * | 11/1977 | Michellone | ........... | B60T 13/683 303/119.2 |
| 4,620,567 | A | * | 11/1986 | Kurtz | ...................... | B60T 15/18 91/426 |
| 5,123,718 | A | * | 6/1992 | Tyler | ....................... | B60T 8/361 303/119.2 |
| 5,234,265 | A | * | 8/1993 | Tyler | ......................... | B60T 8/00 303/119.2 |
| 5,318,354 | A | * | 6/1994 | Tyler | ....................... | B60T 8/367 303/3 |
| 2002/0140282 | A1 | * | 10/2002 | Costa | ..................... | B60T 13/263 188/170 |
| 2023/0182709 | A1 | * | 6/2023 | Sun | ....................... | B60T 13/385 303/9.66 |

FOREIGN PATENT DOCUMENTS

| CN | 106494380 A | 3/2017 |
| CN | 206510904 U | 9/2017 |
| CN | 105035048 B | 10/2017 |

(Continued)

*Primary Examiner* — Jessica Cahill
(74) *Attorney, Agent, or Firm* — Michael Best & Friedrich LLP

(57) ABSTRACT

An air brake electric control valve includes a valve body, a force balance unit including a guide member, and an electromagnetic urge unit including a movable column operable to move between an urging position and a retracted position. When the movable column is at the urging position, the movable column pushes the air guide member such that a through hole of the air guide member is blocked. When the movable column is at the retracted position, a gap is formed between the movable column and the air guide member such that an intermediate section and a second passage of the valve body are in fluid communication via the through hole of the air guide member and the gap.

2 Claims, 20 Drawing Sheets

(56) References Cited

FOREIGN PATENT DOCUMENTS

| | | |
|---|---|---|
| CN | 208036256 U | 11/2018 |
| CN | 208439246 U | 1/2019 |
| CN | 209208745 U | 8/2019 |
| CN | 112124274 A | 12/2020 |
| TW | M581544 U | 8/2019 |

* cited by examiner

AIR BRAKE ELECTRIC CONTROL VALVE

FIELD

The disclosure relates to a brake, and more particularly to an air brake electric control valve.

BACKGROUND

A conventional air brake system includes a plurality of brake calipers or drum brakes that are manually operated to perform the brake function. Generally, the conventional air brake system can be divided into a service brake subsystem and a parking brake sub-system.

The service brake sub-system is adapted to be operated to decelerate or stop a moving vehicle. For example, in rear-axle brake of the conventional air brake system, the service brake sub-system is operated via a pedal, which controls a pressure-release mechanism. Referring to FIG. 1, when the pedal is depressed, air is supplied into a brake chamber 91 of a brake cylinder 9 of the brake calipers or the drum brakes, so that the brake cylinder 9 performs a brake function. High-pressure air is decompressed by the pressure-release mechanism, so as to be conditioned to have an appropriate pressure before entering the brake chamber 91 of a brake cylinder 9. When the pedal is depressed greatly, the decompression effect of the pressure-release mechanism is inferior, and the air having relatively high pressure is introduced into the brake chamber 91 to generate an intense brake function. When the pedal is not depressed, the effect of the pressure-release mechanism is superior, and no air is introduced into the brake chamber 91 so that the brake cylinder 9 does not perform the brake function.

The parking brake sub-system is for keeping a vehicle stationary. Generally, the parking brake sub-system is controlled by a manually-operated valve. The manually-operated valve may be a three-port two-position valve. Referring to FIG. 2, when the manually-operated valve is at a first position, air is supplied into a parking brake chamber 92 of the brake cylinder 9 so that the brake cylinder 9 does not perform the brake function. When the manually-operated valve is at a second position, air ceases to be supplied into the parking brake chamber 92 of the brake cylinder 9 so that the brake cylinder 9 performs the brake function.

It should be noted that when air is introduced into both the brake chamber 91 and the parking brake chamber 92 of the brake cylinder 9 or when no air is introduced into the brake chamber 91 and the parking brake chamber 92 of the brake cylinder 9, the brake cylinder 9 performs the brake function. Specifically, when the vehicle is traveling, air is continuously introduced into the parking brake chamber 92. Air is introduced into the brake chamber 91 to generate the brake function when the vehicle desires to decelerate or stop. When the vehicle is parking, no air is introduced into the brake chamber 91 and the parking brake chamber 92 of the brake cylinder 9, and the brake cylinder 9 performs the brake function.

However, manual operation may not be reliable. When the vehicle parks temporarily without depression of the pedal and without switching the manually-operated valve to the second position, the vehicle may not be kept stationary. An electric control technique may alleviate such a drawback.

Referring to FIG. 3, a conventional electric control technique for controlling the brake cylinder 9 includes steps of: detecting a pressure in a relay valve 83 that is output from an electromagnetic valve 82 by a pressure sensor 81; feeding the value of the pressure to an electronic control unit (ECU) 84 so that the ECU 84 is able to determine how to control the electromagnetic valve 82; and outputting the pressure in the relay valve 83 to the brake cylinder 9. The abovementioned components are costly and are controlled in a complex way. Moreover, it takes a long period of time and a considerable budget to substitute a manually-controlled brake system with an electrically-controlled brake system.

SUMMARY

Therefore, an object of the disclosure is to provide an air brake electric control valve that can alleviate at least one of the drawbacks of the prior art.

According to the disclosure, the air brake electric control valve includes a valve body, a shuttle member, a force balance unit and an electromagnetic urge unit. The valve body has a first passage, a second passage that transversely intersects the first passage, a third passage that transversely intersects the first passage, and a fourth passage that transversely intersects the first passage. The first passage has an end that forms a first inlet. The second passage has an end that communicates with the other end of the first passage opposite to the first inlet, and an opposite end that forms a vent hole. The third passage is disposed adjacent to the first inlet, and has an end that communicates with the first passage, and an opposite end that forms an outlet. The fourth passage is disposed adjacent to the second passage, and has an end that communicates with the first passage, and an opposite end that forms a second inlet. The first passage further has an intermediate section that is located between the third passage and the fourth passage. The shuttle member is disposed at an intersection between the first passage and the third passage. The force balance unit includes an air guide member that extends from the intersection between the first passage and the second passage toward the intersection between the first passage and the fourth passage, and an air guide spring that surrounds the air guide member. The air guide member further has a through hole that extends in the extending direction of the first passage. The air guide member is operable to move between a first air guide position and a second air guide position. The air guide spring resiliently biases the air guide member toward the second air guide position. The electromagnetic urge unit is disposed at the other end of the first passage opposite to the first inlet. The electromagnetic urge unit has a coil, a movable column that is driven by the coil, and an electromagnetic spring that abuts against the movable column. The movable column is operable to move between an urging position and a retracted position. The electromagnetic spring resiliently biases the movable column toward the retracted position. When the movable column is at the urging position, the movable column is moved against the biasing action of the electromagnetic spring to project out of the coil, and pushes the air guide member with an urge force such that the through hole of the air guide member is blocked and that the air guide member is moved to the first air guide position against the biasing action of the air guide spring. When the movable column is at the retracted position, the movable column is biased by the electromagnetic spring to retract into the coil, and a gap is formed between the movable column and the air guide member such that the intermediate section is in fluid communication with the second passage via the through hole of the air guide member and the gap, and that the air guide member is biased to move to the second air guide position by the air guide spring.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
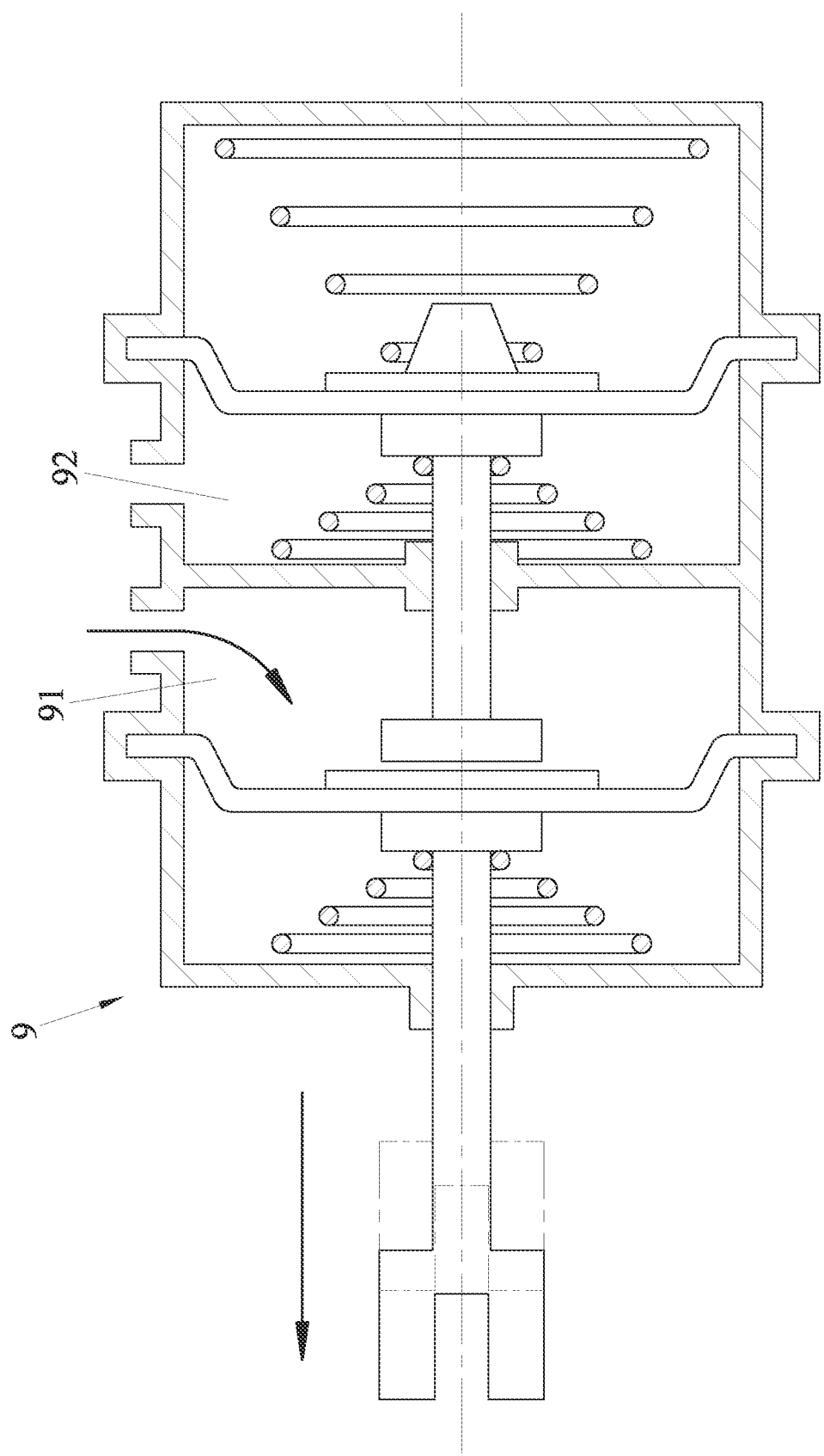
FIG. 1 is a sectional view illustrating a conventional brake cylinder performing brake function.
Figure 2:
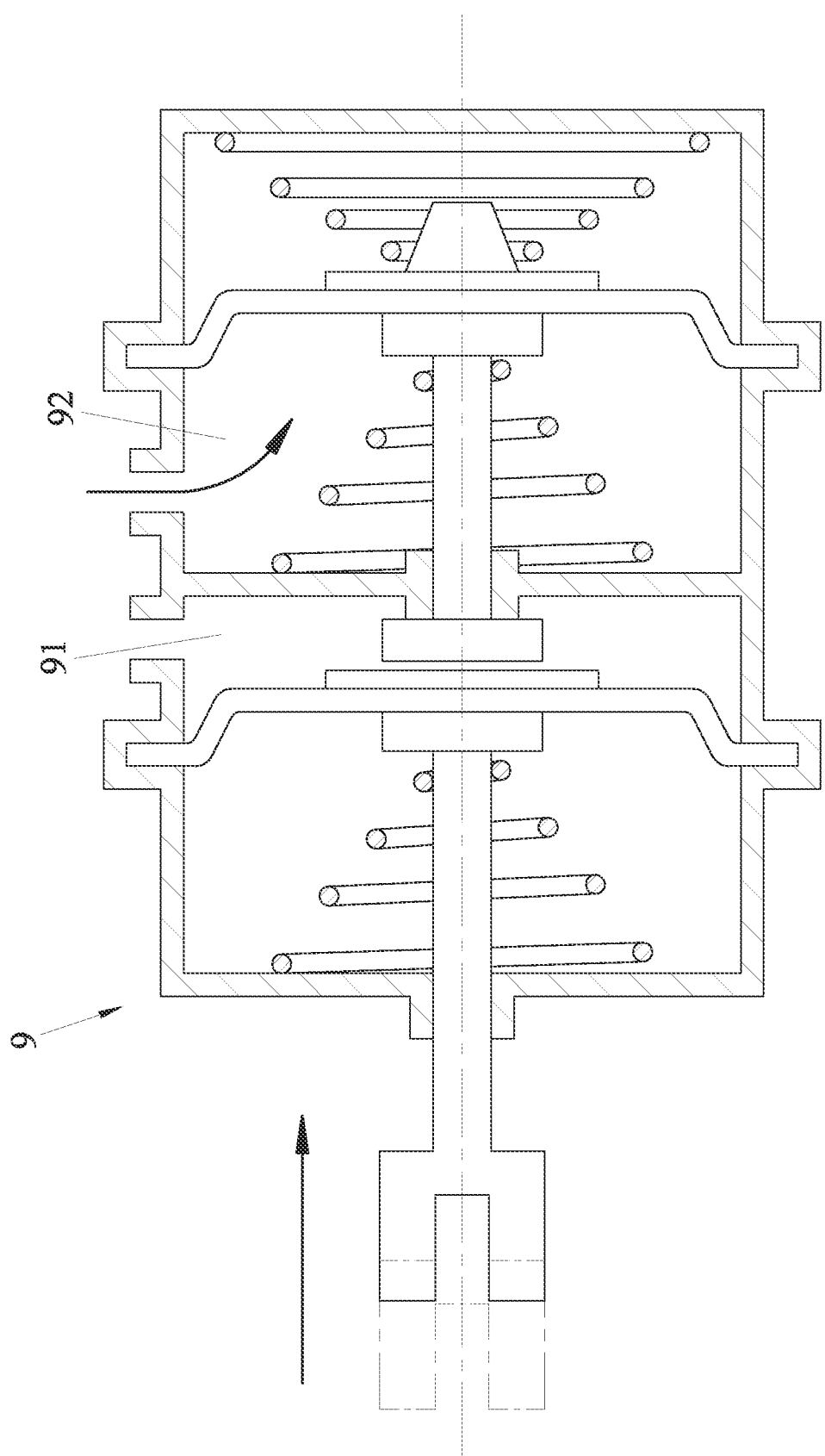
FIG. 2 is sectional view illustrating a conventional brake cylinder not performing the brake function.
Figure 3:
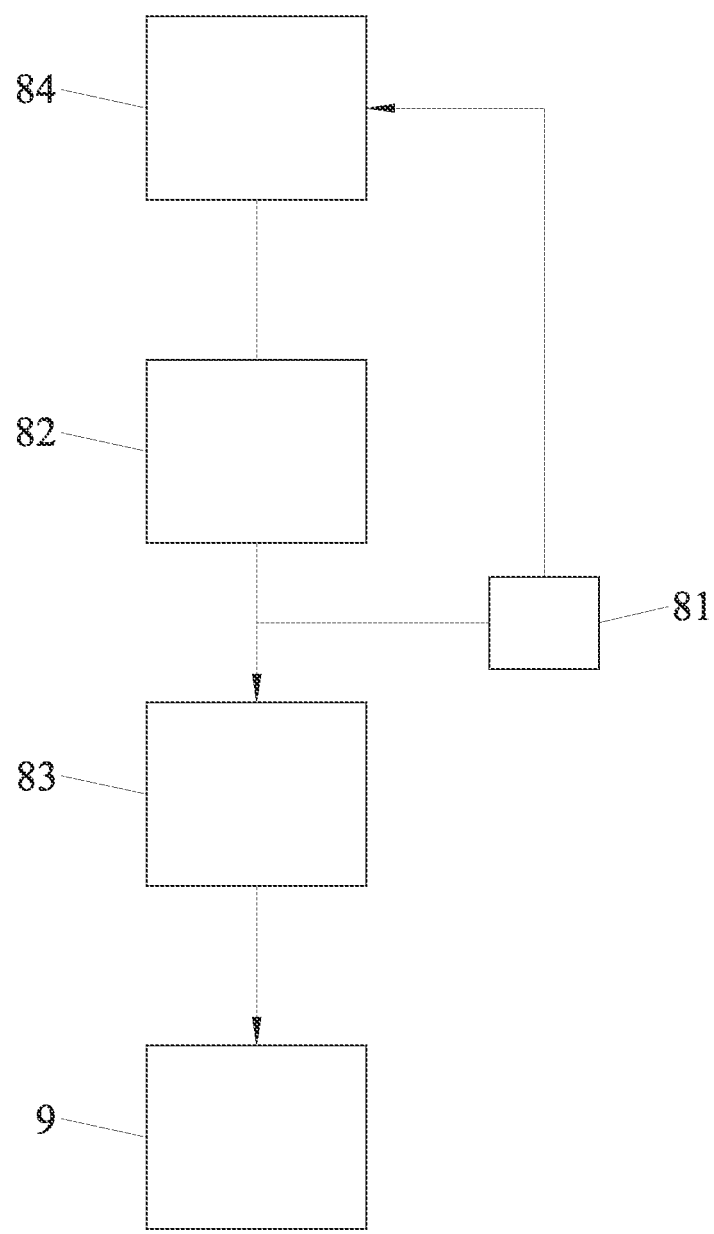
FIG. 3 is block diagram illustrating a conventional electric control technique.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
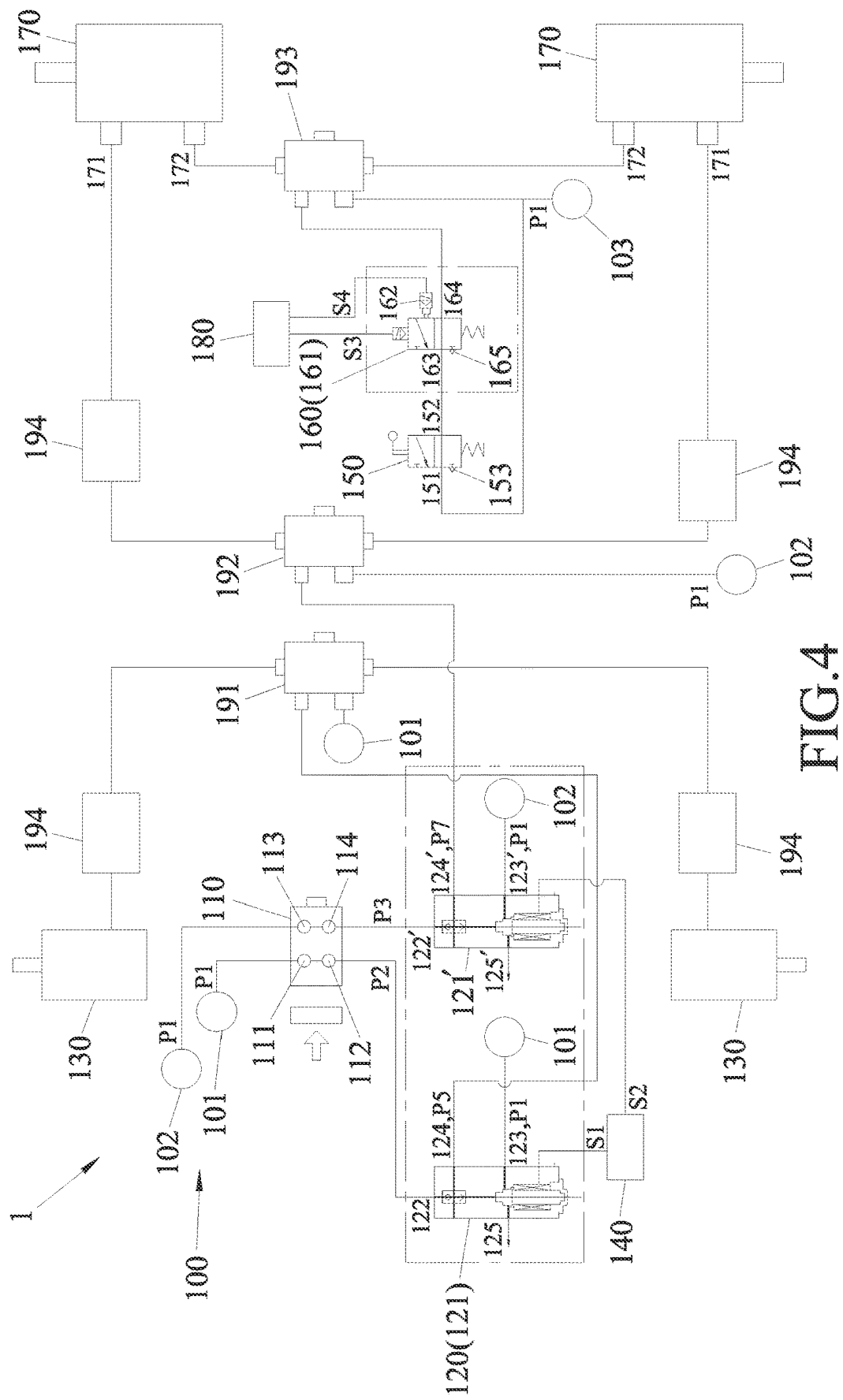
FIG. 4 is a schematic view illustrating an electric control air brake system.

Referring to FIG. 4, an electric control air brake system 1 includes an air supply unit 100, a manual control pressure regulator 110, an electric control pressure regulator 120, two front axle brake cylinders 130, a first electric control unit 140, an air parking brake manual valve 150, an air parking brake electric control valve 160, two rear axle brake cylinders 170, a second electric control unit 180, a front axle relay valve 191, a rear axle relay valve 192, a parking brake relay valve 193, and four anti-lock electromagnetic valves 194.

The air supply unit 100 supplies air with a first pressure (P1). The first pressure (P1) is higher than an ambient air pressure. The air supply unit 100 includes a front axle reservoir 101, a rear axle reservoir 102 and a parking brake reservoir 103. Specifically, the air supply unit 100 employs an air compressor to compress the ambient air to the first pressure (P1), and distributes the air with the first pressure (P1) to the front axle reservoir 101, the rear axle reservoir 102 and the parking brake reservoir 103. The front axle reservoir 101, the rear axle reservoir 102 and the parking brake reservoir 103 are for temporarily storing, the compressed air, and the air pressure in the front axle reservoir 101, the rear axle reservoir 102 and the parking brake reservoir 103 is also the first pressure (P1).

It should be noted that in FIG. 4, a plurality of the front axle reservoir 101, and a plurality of the rear axle reservoir 102 are shown for illustrating how the compressed air is distributed. However, only one front axle reservoir 101 and only one rear axle reservoir 102 are able to distribute the compressed air to the locations shown in FIG. 4.

The manual control pressure regulator 110 has a first inlet 111 that is connected to the front axle reservoir 101, a first outlet 112 that corresponds to the first inlet 111, a second inlet 113 that is connected to the rear axle reservoir 102, and a second outlet 114 that corresponds to the second inlet 113. The air inputted via the first inlet 111 is manually controlled to be conditioned to a second pressure (P2), and is outputted via the first outlet 112. The air inputted via the second inlet 113 is manually controlled to be conditioned to a third pressure (P3), and is outputted via the second outlet 114. The manual control pressure regulator 110 is well-understood in the art, and will not be further described in the following paragraphs.

The electric control pressure regulator 120 includes a front axle air brake electric control valve 121 and a rear axle air brake electric control valve 121'. The front axle air brake electric control valve 121 has a first inlet 122 that is connected to the first outlet 112 of the manual control pressure regulator 110, a second inlet 123 that is connected to the front axle reservoir 101, an outlet 124 and a vent hole 125. The air inputted via the second inlet 123 of the front axle air brake electric control valve 121 is electrically controlled to be conditioned to a fourth pressure (P4). The air output from the outlet 124 of the front axle air brake electric control valve 121 has a fifth pressure (P5). The fifth pressure (P5) is equal to a greater one of the second pressure (P2) and the fourth pressure (P4). The rear axle air brake electric control valve 121' has a first inlet 122' that is connected to the second outlet 114 of the manual control pressure regulator 110, a second inlet 123' that is connected to the rear axle reservoir 102, an outlet 124' and a vent hole 125'. The air inputted via the second inlet 123' Of the rear axle air brake electric control valve 121' is electrically controlled to be conditioned to a sixth pressure (26). The air outputted from the outlet 124' of the rear axle air brake electric control valve 121' has a seventh pressure (P7). The seventh pressure (P7) is equal to a greater one of the third pressure (P3) and the sixth pressure (P6).

The front axle air brake electric control valve 121 and the rear axle air brake electric control valve 121' of the electric control air brake system 1 are structurally identical to each other, are the same type of air brake electric control valve 2, and are different from each other in the connection among other components. The air brake electric control valve 2 would be described in detail in the following paragraphs.

The front axle brake cylinders 130 are driven by the fifth pressure (P5), and perform a brake function when the fifth pressure (P5) is higher than the ambient air pressure. The first electric control unit 140 generates a first electric signal (S1) for controlling the front axle air brake electric control valve 121, and a second electric signal (S2) for controlling the rear axle air brake electric control valve 121'. The front axle brake cylinders 130 of the electric control air brake system 1 are well-understood in the art, and will not be further described in the following paragraphs.

The air parking brake manual valve 150 is configured as a normally-open three-port two-position valve, and is manually operable to be switched between a traveling position and a parking position. The air parking brake manual valve 150 has an inlet 151 that is connected to the parking brake reservoir 103, an outlet 152 and a vent hole 153. When the air parking brake manual valve 150 is in the traveling position, the inlet 151 and the outlet 152 of the air parking brake manual valve 150 are in fluid communication, and the vent hole 153 and the outlet 152 of the air parking brake manual valve 150 are not in fluid communication. When the air parking brake manual valve 150 is in the parking position, the inlet 151 and the outlet 152 of the air parking brake manual valve 150 are not in fluid communication, and the vent hole 153 and the outlet 152 of the air parking brake manual valve 150 are in fluid communication. The air parking brake manual valve 150 of the electric control air brake system 1 is well-understood in the art, and will not be further described in the following paragraphs.

The air parking brake electric control valve 160 includes an air valve unit 161, and a self-lock unit 162 that is mounted to the air valve unit 161. The air valve unit 161 configured as a normally-open three-port two-position valve, and is electrically operable to be switched between a first position and a second position. The air valve unit 161 has an inlet 163 that is connected to the outlet 152 of the air parking brake manual valve 150, an outlet 164, and a vent hole 165. When the air valve unit 161 is in the first position, the inlet 163 and the outlet 164 of the air valve unit 161 are in fluid communication, and the vent hole 165 and the outlet 164 of the air valve unit 161 are not in fluid communication. When the air valve unit 161 is in the second position, the inlet 163 and the outlet 164 of the air valve unit 161 are not in fluid communication, and the vent hole 165 and the outlet 164 of the air valve unit 161 are in fluid communication. The self-lock unit 162 is electrically operable to be switched between a release position and a lock position. When the self-lock unit 162 is in the release position, the air valve unit 161 is switchable between the first position and the second position. When the self-lock unit 162 is in the lock position, the air valve unit 161 is locked at the second position. The air parking brake electric control valve 160 will be described in detail in the following paragraphs.

Each of the rear axle brake cylinders 170 has a first inlet 171 for receiving the seventh pressure (P7), and a second inlet 172 for receiving the compressed air from the outlet 164 of the air parking brake electric control valve 160. Each of the rear axle brake cylinders 170 performs a brake function when the seventh pressure (P7) is approximate to the ambient air pressure and when the pressure in the second inlet 172 thereof is approximate to the ambient air pressure. Each of the rear axle brake cylinders 170 performs the brake function when the seventh pressure (P7) is higher than the ambient air pressure and when the pressure in the second inlet 172 thereof is approximate to the ambient air pressure. Each of the rear axle brake cylinders 170 does not perform the brake function when the seventh pressure (P7) is approximate to the ambient air pressure and when the pressure in the second inlet 172 thereof is higher than the ambient air pressure. The rear axle brake cylinders 170 of the electric control air brake system 1 are well-understood in the art, and will not be further described in the following paragraphs.

The second electric control unit 180 generates a third electric signal (S3) for controlling the air valve unit 161 of the air parking brake electric control valve 160, and a fourth electric signal (S4) for controlling the self-lock unit 162 of the air parking brake electric control valve 160. It should be noted that, in the example above, the first electric control unit 140 and the second electric control unit 180 are independent from each other. However, in another example, the electric control air brake system 1 may employ a single control unit to execute the functions of the first electric control unit 140 and the second electric control unit 180.

The front axle relay valve 191 is connected among the front axle air brake electric control valve 121 and the front axle brake cylinders 130. The rear axle relay valve 192 is connected among the rear axle air brake electric control valve 121' and the rear axle brake cylinders 170. The parking brake relay valve 193 is connected among air barking brake electric control valve 160 and the rear axle brake cylinders 170. Two of the anti-lock electromagnetic valves 194 are respectively connected to the front axle brake cylinders 130 and are connected to the front axle relay valve 191. The other two of the anti-lock electromagnetic valves 194 are respectively connected to the rear axle brake cylinders 170 and are connected to the rear axle relay valve 192. The front axle relay valve 191, the rear axle relay valve 192, the parking brake relay valve 193 and the anti-lock electromagnetic valves 194 are well-understood in the art, and will not be further described in the following paragraphs. In one example, the front axle relay valve 191 may be configured as a quick release valve.

For service brake consideration, when it is desired to decelerate or stop a moving vehicle, the first electric control unit 140 is operated to generate the first electric signal (S1) and the second electric signal (S2) for performing the brake function (via the front axle brake cylinders 130 and the rear axle brake cylinders 170).

Specifically, when there is no manual operation, the manual control pressure regulator 110 would not output compressed air. That is to say, the second pressure (P2) and the third pressure (P3) are substantially equal to the ambient air pressure. Thus, the fifth pressure (P5) output by the front axle air brake electric control valve 121 is the fourth pressure (P4), and the seven pressure (P7) output by the rear axle air brake electric control valve 121' is the sixth pressure (P6). The fourth pressure (P4) and the sixth pressure (P6) are respectively control led by the first electric signal (S1) and the second electric signal (S2), and are irrelevant to manual control. At this time, the intensity of the brake function is control led by the first electric control unit 140.

When there exists manual operation (for example, via a pedal), the manual control pressure regulator 110 would output compressed air. That is to say, the second pressure (P2) and the third pressure (P3) are higher than the ambient air pressure. Thus, the fifth pressure (P5) outputted by the front axle air brake electric control valve 121 is equal to the greater one of the second pressure (P2) and the fourth pressure (P4), the seven pressure (P7) outputted by the rear axle air brake electric control valve 121' is equal to the greater one of the third pressure (P3) and the sixth pressure (P6). At this time, the intensity of the brake function is not necessarily controlled by the first electric control unit 140. When the second pressure (P2) and the third pressure (P3) resulting from the manual operation are respectively higher than the fourth pressure (P4) and the sixth pressure (P6), the intensity of the brake function is manually controlled. As a result, if the moving vehicle needs to be stopped under special consideration (e.g., an emergency), the brake function is controlled by manual operation. In other words, the manual control has priority over the electric control.

For parking brake consideration, when it is desired to prevent a stationary vehicle from moving, the second electric control unit 180 is operated to generate the third electric signal (S3) and the fourth electric signal (S4) for performing the brake function.

Specifically, when there is no manual operation, the air parking brake manual valve 150 is in the traveling position, and outputs the first pressure (P1) The air valve unit 161 of the air parking brake electric control valve 160 is able to be controlled by the third electric signal (33) to be switched to the second position to thereby stop outputting the first pressure (P1) so as to perform the brake function. The self-lock unit 162 of the air parking brake electric control valve 160 is able to be controlled by the fourth electric signal (S4) to be switched to the lock position to thereby keep the air valve unit 161 in the second position. At this time, the brake function and the lock function are controlled by the second electric control unit 180.

When there exists a manual operation where the air parking brake manual valve 150 is manually switched into the parking position, the air parking brake manual valve 150 stops outputting the first pressure (P1), and the air valve unit 161 of the air parking brake electric control valve 160 thereby cannot output the first pressure (P1) so that the brake function is performed. As a result, if a vehicles unable to be kept stationary by the second electric control unit 180, the brake function can be achieved by manual operation. In other words, the manual control has priority over the electric control.

In summary, the electric control air brake system 1 is able to execute service brake and parking brake by electric control, and is able to be integrated with a digital control software to accomplish assisted driving technique (e.g., autonomous emergency braking (AEB), electronic brake system (EBS), adaptive cruise control (ACC) or autonomous driving).

In addition, to avoid the use of expensive and complex electric control components, the electric control air brake system 1 according to the disclosure can be made by retrofitting a conventional air brake system with the electric control pressure regulator 120 and the air parking brake electric control valve 160. The electric control pressure regulator 120 and the air parking brake electric control valve 160 are the key points of this disclosure, and are bounded by dot-dash broken lines in FIG. 4. The other components other than the bounded portions are similar to/the same as a conventional air brake system.

Figure 5:
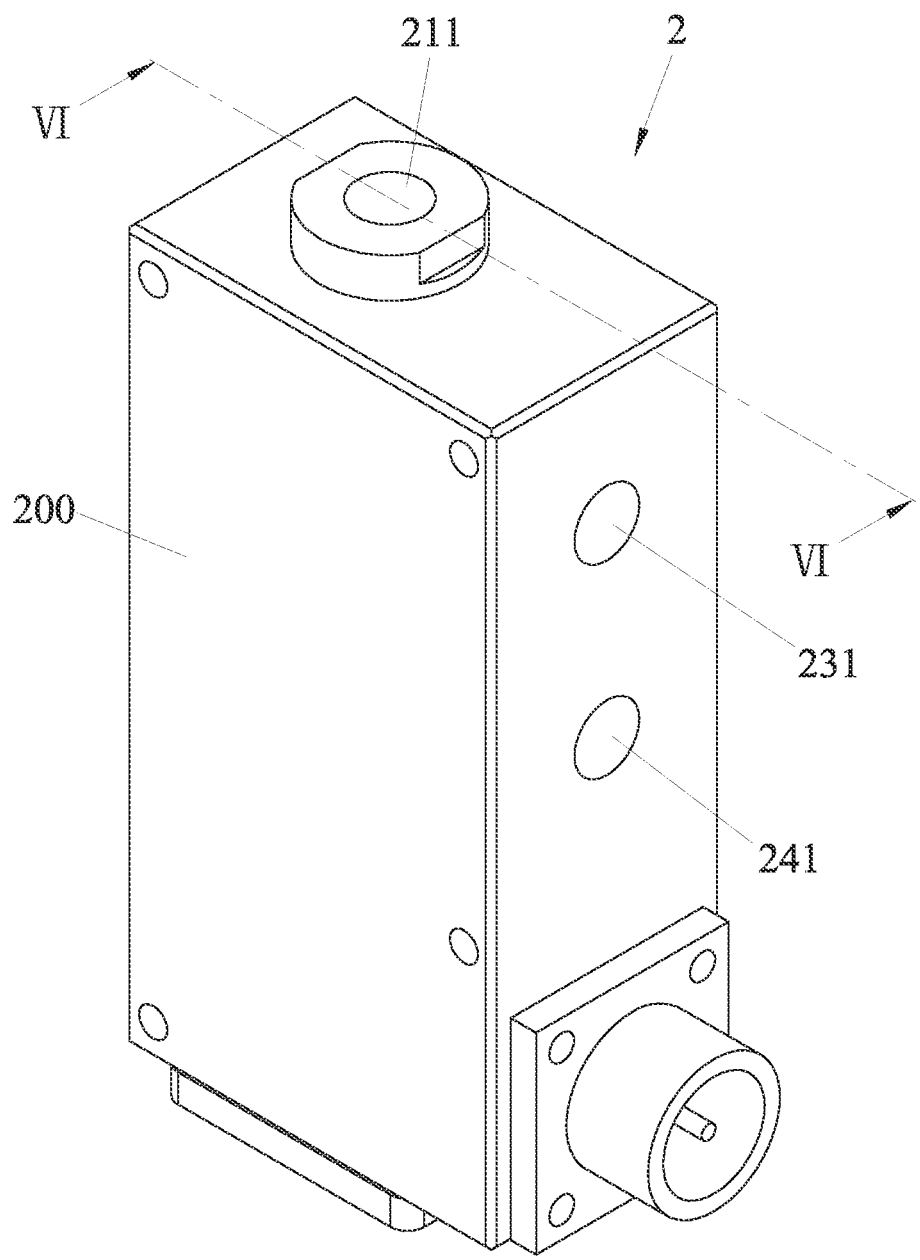
FIG. 5 is a perspective view illustrating an air brake electric control valve according to the disclosure.
Figure 6:
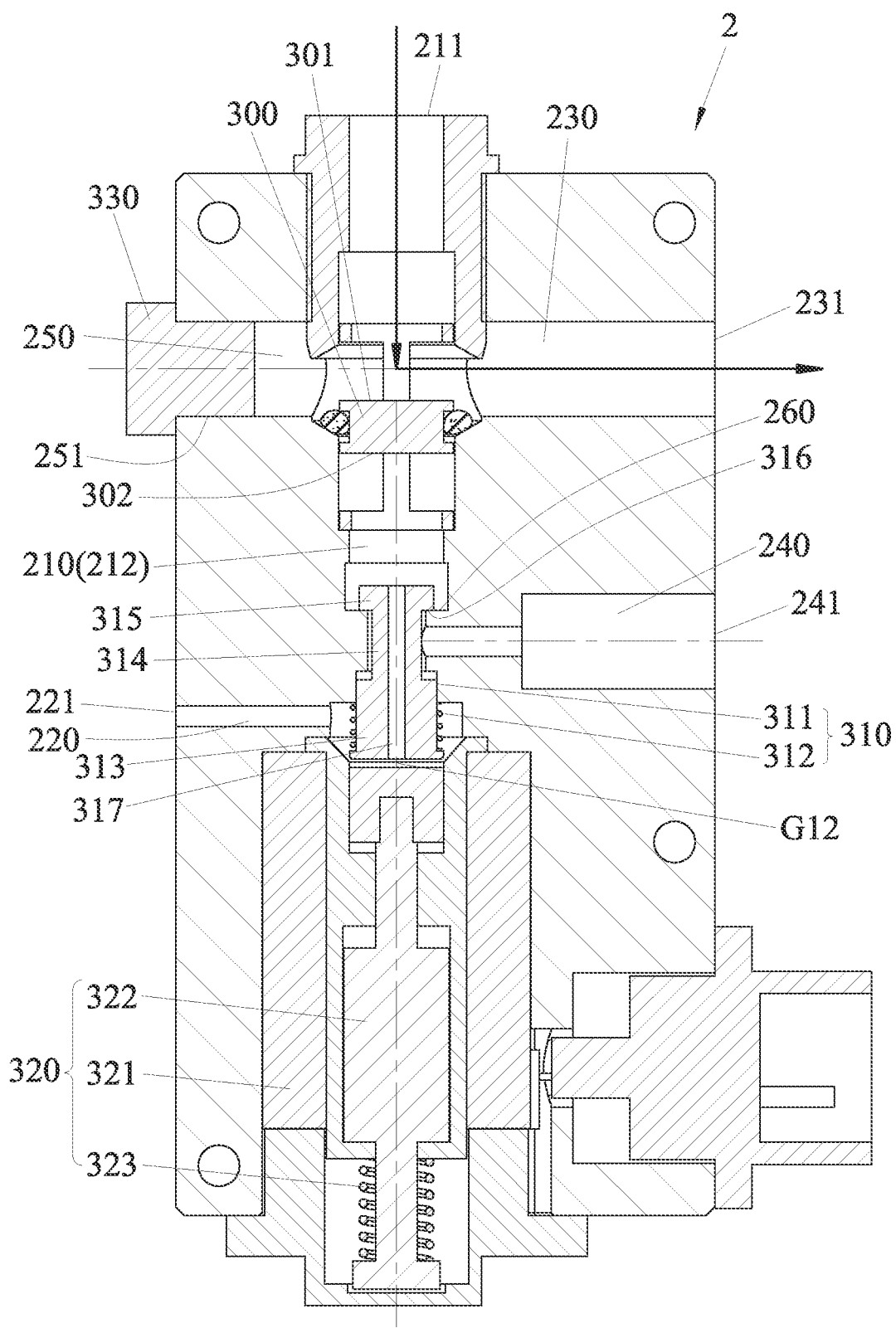
FIG. 6 is a sectional view taken along line VI-VI in FIG. 5, illustrating a shuttle member at a first blocking position.

The front axle air brake electric control valve 121 and the rear axle air brake electric control valve 121' of the electric control air brake system 1 are structurally identical to each other, and are configured as the same type of air brake electric control valve 2. Referring to FIGS. 5 and 6, an air brake electric control according to the disclosure may serve as the front axle air brake electric control valve 121 or the rear axle air brake electric control valve 121', and includes a valve body 200, a shuttle member 300, a force balance unit 310, an electromagnetic urge unit 320 and a plug 330.

The valve body 200 has a first passage 210, a second passage 220 that transversely intersects the first passage 210, a third passage 230 that transversely intersects the first passage 210, a fourth passage 240 that transversely intersects the first passage 210, and a fifth passage 250 that transversely intersects the first passage 210. The first passage 210 has an end that forms a first inlet 211. The second passage 220 has an end that communicates with the other end of the first passage 210 opposite to the first inlet 211, and an opposite end that forms a vent hole 221. The third passage 230 is disposed adjacent to the first inlet 211, and has an end that communicates with the first passage 210, and an opposite end that forms an outlet 231. The fourth passage 240 is disposed adjacent to the second passage 220, and has an end that communicates with the first passage 210, and an opposite end that forms a second inlet 241. The fifth passage 250 has an end that communicates with the intersection between the first passage 210 and the third passage 230, and an opposite end that serves as a vent hole 251 and that is blocked by the plug 330. The first passage 210 has an intermediate section 212 that is located between the third passage 230 and the fourth passage 240. The valve body 200 further has a first shoulder surface 260 that corresponds in position to the intermediate section 212 and that faces the first inlet 211.

In an example, the first inlet 211 of the air brake electric control valve 2 may serve as the first inlet 122 of the front axle air brake electric control valve 121 or the first inlet 122' of the rear axle air brake electric control valve 121'. The vent hole 211 of the air brake electric control valve 2 may serve as the vent hole 125 of the front axle air brake electric control valve 121 or the vent hole 125' of the rear axle air brake electric control valve 121'. The second inlet 241 of the air brake electric control valve 2 may serve as the second inlet 123 of the front axle air brake electric control valve 121 or the second inlet 123' of the rear axle air brake electric control valve 121'. The outlet 231 of the air brake electric control valve 2 may serve as the outlet 124 of the front axle air brake electric control valve 121 or the outlet 124' of the rear axle air brake electric control valve 121'.

The shuttle member 300 is disposed at an intersection between the first passage 210 and the third passage 230, and has a first blocking surface 301 that faces the first inlet 211, and a second blocking surface 302 that faces the intermediate section 212. The shuttle member 300 is operable to move between a first blocking position (see FIG. 6) and a second blocking position (see FIGS. 7 to 10). When the pressure in the first inlet 211 is higher than the pressure in the intermediate section 212, the shuttle member 300 is moved to the first blocking position where the shuttle member 300 is locate at one side of the third passage 230 distal from the first inlet 211 and where the shuttle member 300 blocks the first passage 210 with the second blocking surface 302 thereof such that the first inlet 211 and the outlet 231 are in fluid communication and that the intermediate section 212 and the outlet 231 are not in fluid communication. When the pressure in the first inlet 211 is lower than the pressure in the intermediate section 212, the shuttle member 300 is moved to the second blocking position where the shuttle member 300 is locate at another side of the third passage 230 distal from the intermediate section 212 and where that shuttle member 300 blocks the first passage 210 with the first blocking surface 301 thereof such that the first inlet 211 and the outlet 231 are not in fluid communication and that the intermediate section 212 and the outlet 231 are in fluid communication.

The force balance unit 310 includes an air guide member 311 that extends from the intersection between the first passage 210 and the second passage 220 toward the intersection between the first passage 210 and the fourth passage 240, and an air guide spring 312 that surrounds the air guide member 311. The air guide member 311 has a base portion 313, a neck portion 314 and a head portion 315 that are sequentially interconnected. The base portion 313 is located at the intersection between the first passage 210 and the second passage 220. The neck portion 314 is located at the intersection between the first passage 210 and the fourth passage 240. The head portion 315 is located at the intermediate section 212. The air guide member 311 further has an air guide shoulder surface 316 that is located between the neck portion 314 and the head portion 315 and that faces the base portion 313. The air guide member 311 further has a through hole 317 that extends in the extending direction of the first passage 210 and that extends through the base portion 313, the neck portion 314 and the head portion 315.

The air guide member 311 is operable to move between a first air guide position (see FIG. 8) and a second air guide position (see FIGS. 6, 7, 9 and 10). When the air guide member 311 is at the first air guide position, the air guide shoulder surface 316 is spaced apart from the first shoulder surface 260 and cooperates with the first shoulder surface 260 to define a first gap (G11) therebetween. When the air guide member 311 is at the second air guide position, the air guide shoulder surface 316 abuts against the first shoulder surface 260 such that the intermediate section 212 and the fourth passage 240 are not in fluid communication. The air guide spring 312 resiliently biases the air guide member 311 toward the second air guide position.

The electromagnetic urge unit 320 is disposed at the other end of the first passage 210 opposite to the first inlet 211. The electromagnetic urge unit 320 has a coil 321, a movable column 322 that is driven by the coil 321, and an electromagnetic spring 323 that abuts against the movable column 322. The movable column 322 is operable to move between an urging position (see FIGS. 8 and 9) and a retracted position (see FIGS. 6, 7 and 10). The electromagnetic spring 323 resiliently biases the movable column 322 toward the retracted position. When the movable column 322 is at the urging position, the movable column 322 is moved against the biasing action of the electromagnetic spring 323 to project out of the coil 321, and pushes the air guide member 311 with an urge force such that the through hole 317 of the air guide member 311 is blocked and that the air guide member 311 is moved to the first air guide position against the biasing action of the air guide spring 312. When the movable column 322 is at the retracted position, the movable column 322 is biased by the electromagnetic spring 323 to retract into the coil 321, and a second gap (G12) is formed between the movable column 322 and the air guide member 311 such that the intermediate section 212 is in fluid communication with the second passage 220 via the through hole 317 of the air guide member 311 and the second gap (G12), and that the air guide member 311 is biased to move to the second air guide position by the air guide spring 312.

When the pressure in the first inlet 211 is higher than the pressure in the intermediate section 212 (i.e., the second pressure (P2) is higher than the fourth pressure (P4), or the third pressure (P3) is higher than the sixth pressure (P6)), the shuttle member 300 is at the first blocking position, and the pressure input into the first inlet 221 is directly outputted via the outlet 231. At this time, the force balance unit 310 and the electromagnetic urge unit 320 are irrelevant to the outputted pressure via the outlet 231. In other words, the brake function is manually controlled.

When the pressure in the first inlet 211 is lower than the pressure in the intermediate section 212 (i.e., the second pressure (P2) is lower than the fourth pressure (P4), or the third pressure (P3) is lower than the sixth pressure (P6)), the shuttle member 300 is at the second blocking position, and the pressure output via the outlet 231 is equal to the pressure in the intermediate section 212. At this time, the force balance unit 310 and the electromagnetic urge unit 320 control the output pressure via the outlet 231. In other words, the brake function is electrically controlled. Specifically, the air brake electric control valve 2 is switched among an initial state, a pressure-increasing state, a pressure-maintaining state and a pressure-release state.

Figure 7:
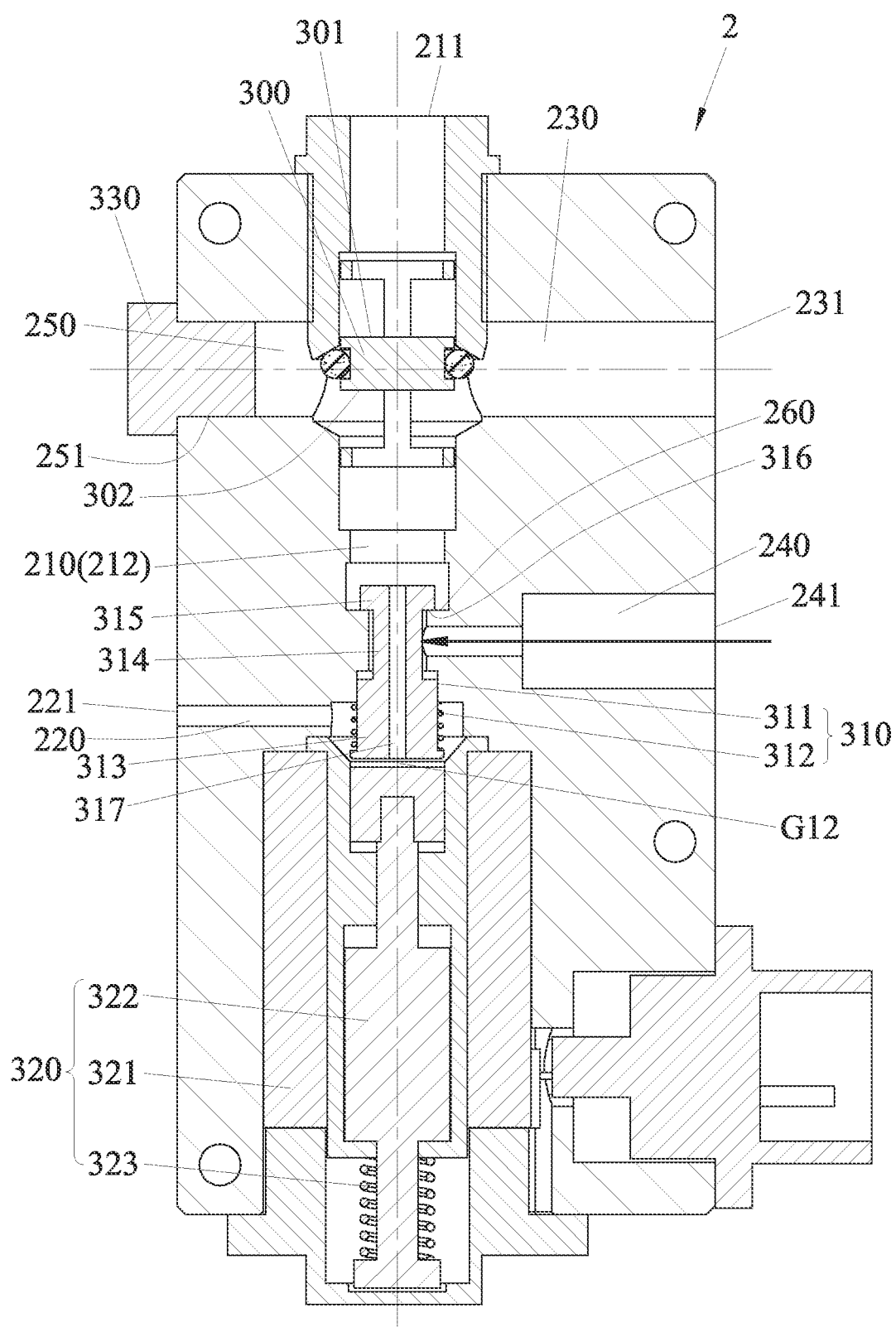
FIG. 7 is a view similar to FIG. 6, illustrating the air brake electric control valve at an initial state.

Referring to FIG. 7, when the air brake electric control valve 2 is in the initial state, the coil 321 of the electromagnetic urge unit 320 is not energized, and the movable column 322 is at the retracted position. The air guide member 311 of the force balance unit 310 is at the second air guide position, so the intermediate section 212 and the fourth passage 240 are not in fluid communication. The pressure the intermediate section 212 is not affected by the pressure in the second inlet 241, and cannot be increased, so the brake function is not performed.

Figure 8:
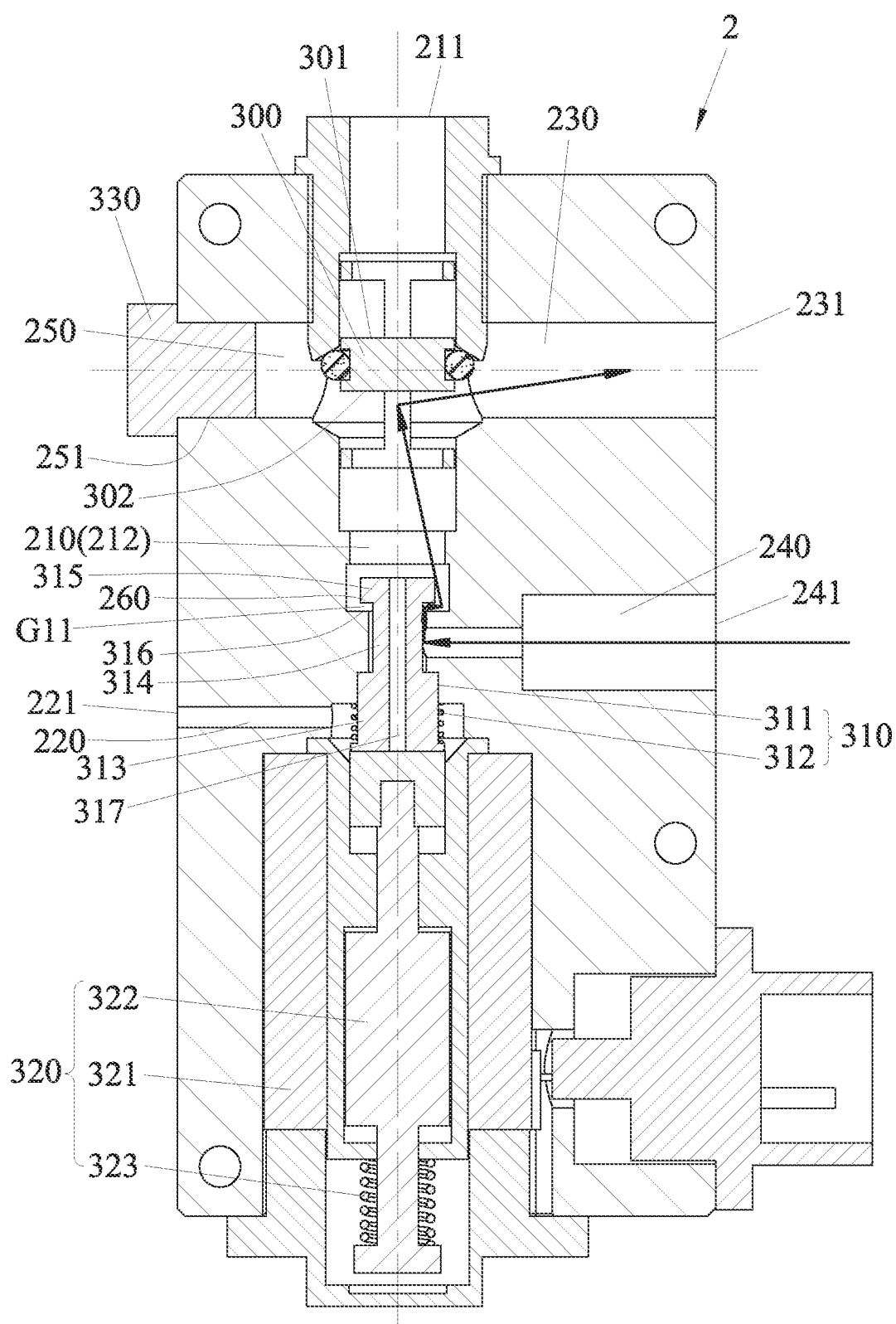
FIG. 8 is a view similar to FIG. 6, illustrating the air brake electric control valve at a pressure-increasing state.

Referring to FIG. 8, when the air brake electric control valve 2 is in the pressure-increasing state, the coil 321 of the electromagnetic urge unit 320 is energized, and the movable column 322 is at the urging position. The air guide member 311 of the force balance unit 310 is at the first air guide position, so the intermediate section 212 and the fourth passage 240 are in fluid communication. The pressure in the intermediate section 212 is affected by the pressure in the second inlet 241 to be increased, so the brake function is performed.

Figure 9:
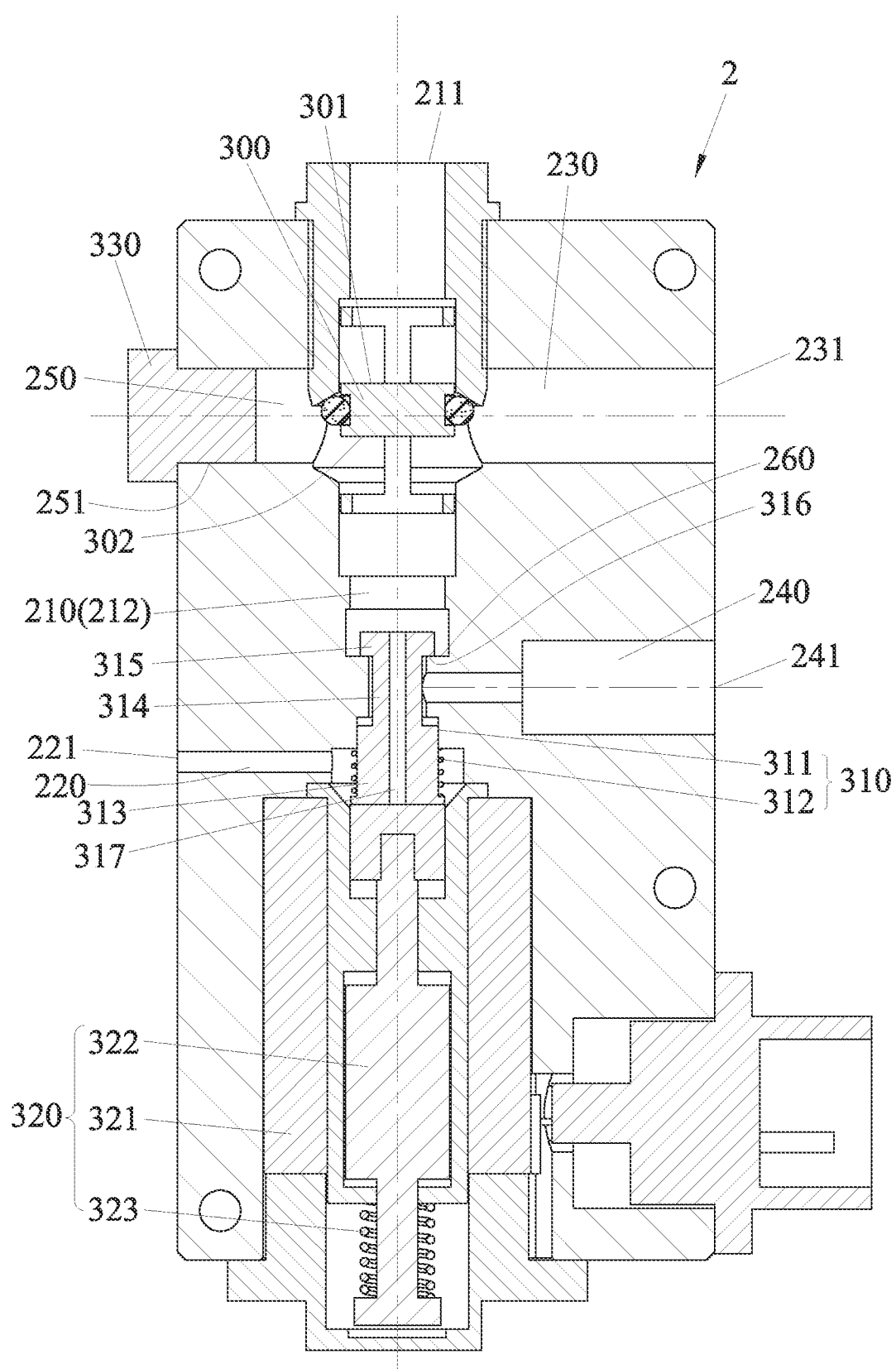
FIG. 9 is a view similar to FIG. 6, illustrating the air brake electric control valve at a pressure-maintaining state.

Referring to FIG. 9, the air guide member 311 is pushed by the urge force exerted by the movable column 322, and is further subjected to a counter force in a direction opposite to that of the urge force resulting from the pressure in the intermediate section 212. As such, when the pressure in the intermediate section 212 is increased to reach a predetermined degree, the counter force balances out the urge force so that the air brake electric control valve 2 is switched into the pressure-maintaining state. In the pressure-maintaining state, the air guide member 311 of the force balance unit 310 is at the second air guide position, so the intermediate section 212 and the fourth passage 240 are not in fluid communication, and the pressure in the intermediate section 212 is thereby stopped from being increased, and is kept at the predetermined degree in which the counter force resulting from the pressure in the intermediate section 212 is sufficient to balance out the urge force. When the pressure in the intermediate section 222 decreases such that the counter force resulting from the pressure in the intermediate section 212 is insufficient to balance out the urge force, the air guide member 311 of the force balance unit 310 is moved to the first air guide position, and the air brake electric control valve 2 is switched into the pressure-increasing state. Therefore, the pressure in the intermediate section 212 can be controlled by controlling the urge force generated by the electromagnetic urge unit 320. Specifically, when the electric current in the coil 321 is greater, the urge force generated by the electromagnetic urge unit 320 is greater, so the pressure in the intermediate section 212 needs to be increased to a higher degree to generate a sufficient counter force to balance out the urge force so that the air brake electric control valve 2 is switched into the pressure-maintaining state. When the electric current in the coil 321 is smaller, the urge force is smaller, so the pressure in the intermediate section 212 only needs to be increased to a relatively low degree to generate a sufficient counter force to balance out the urge force for switching the air brake electric control valve 2 into the pressure-maintaining state. Since the electromagnetic urge unit 320 is controlled by the first electric signal (S1) and the second electric signal (S2), the intensity of the brake function is controlled by the first electric control unit 140.

Figure 10:
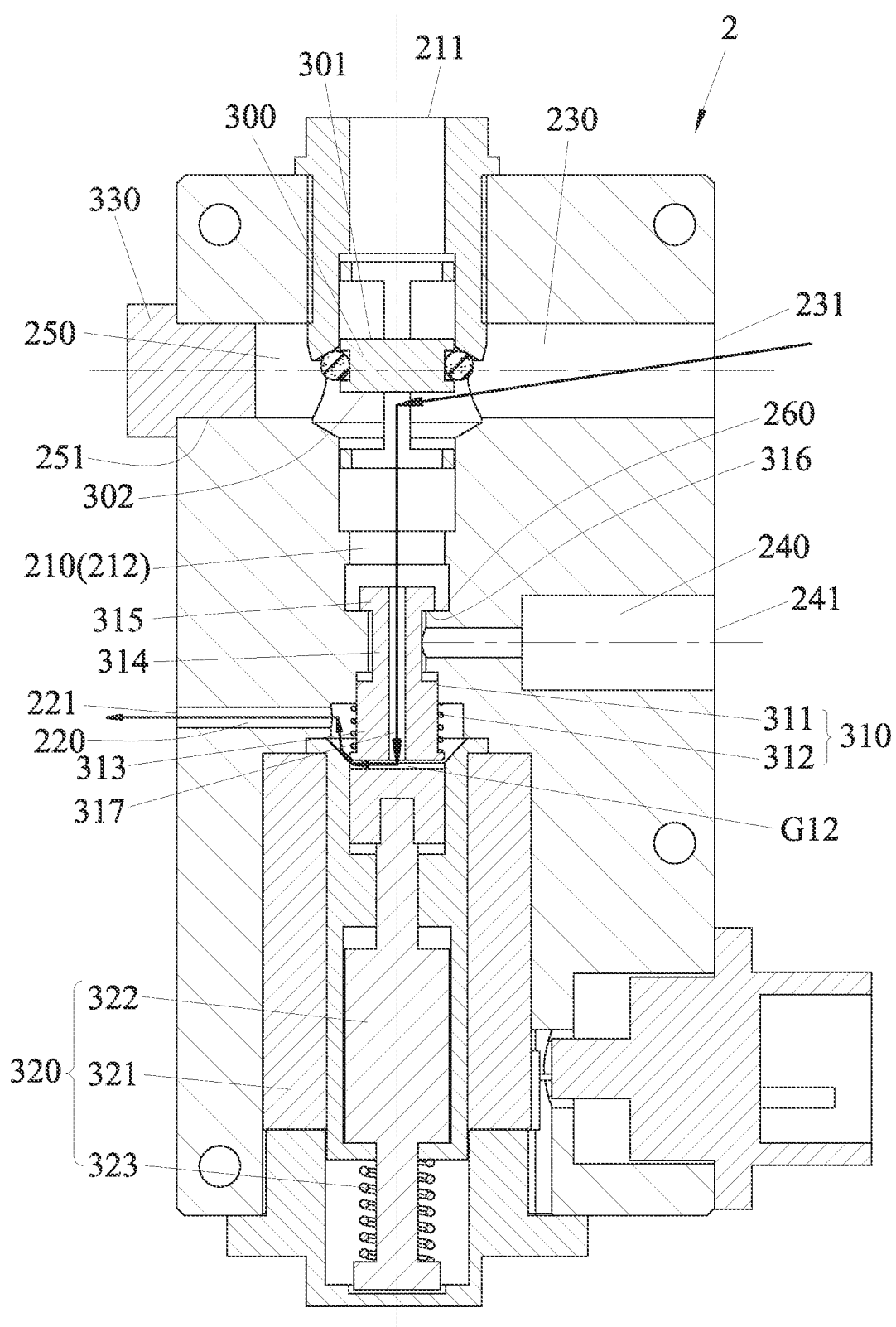
FIG. 10 is a view similar to FIG. 6, illustrating the air brake electric control valve at a pressure-release state.

Referring to FIG. 10, to lower the pressure in the intermediate section 212, the electric current in the coil 321 needs to be lowered so as to move the movable column 322 to the retracted position. At this time, the intermediate section 212 is in fluid communication with the second passage 220 via the through hole 317 and the second gap (G12), so the pressure in the intermediate section 212 can be released via the outlet 221. When the pressure in the intermediate section 212 is lowered to a predetermined degree, the air brake electric control valve is switched into the pressure-maintaining state. As such, the intensity of the brake function is controlled by controlling the electric current in the coil 321. The coil 321 is de-energized when the brake function is not desired.

Figure 11:
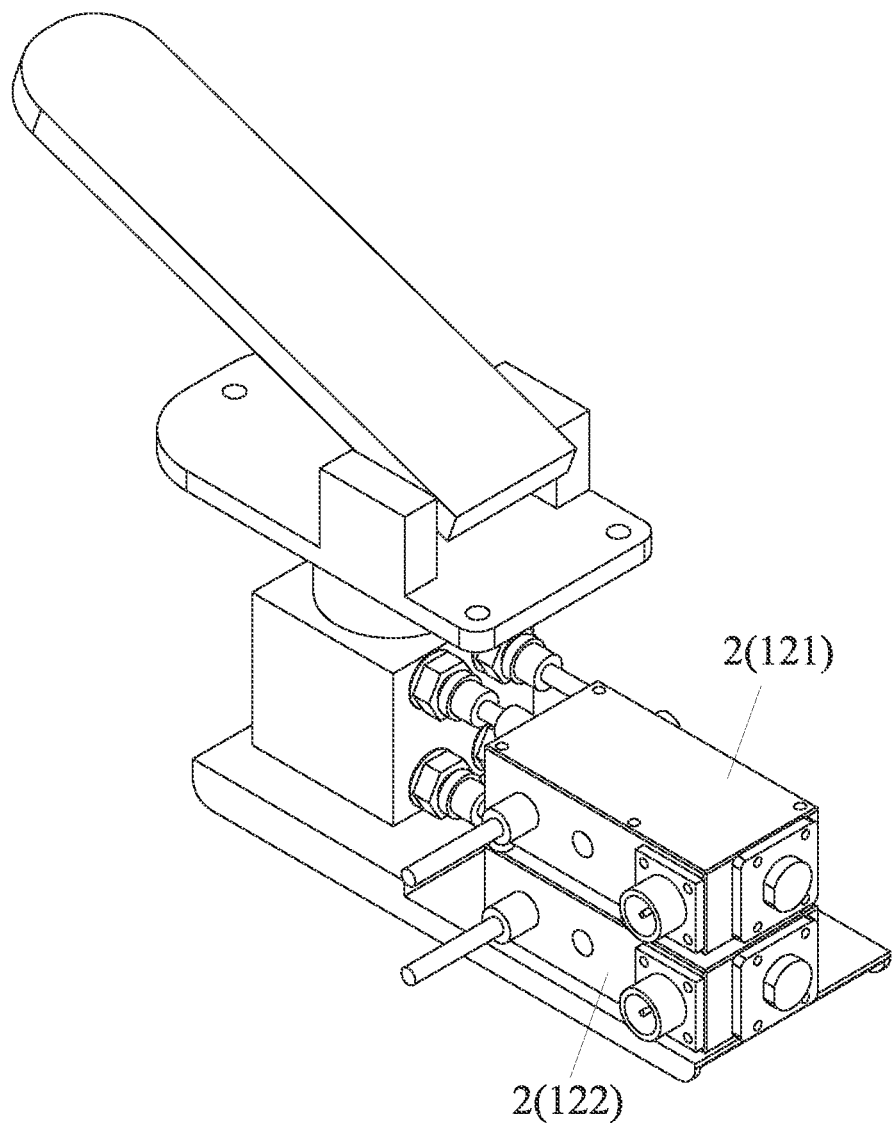
FIG. 11 is an assembled perspective view illustrating two of the air brake electric control valves being integrated.
Figure 12:
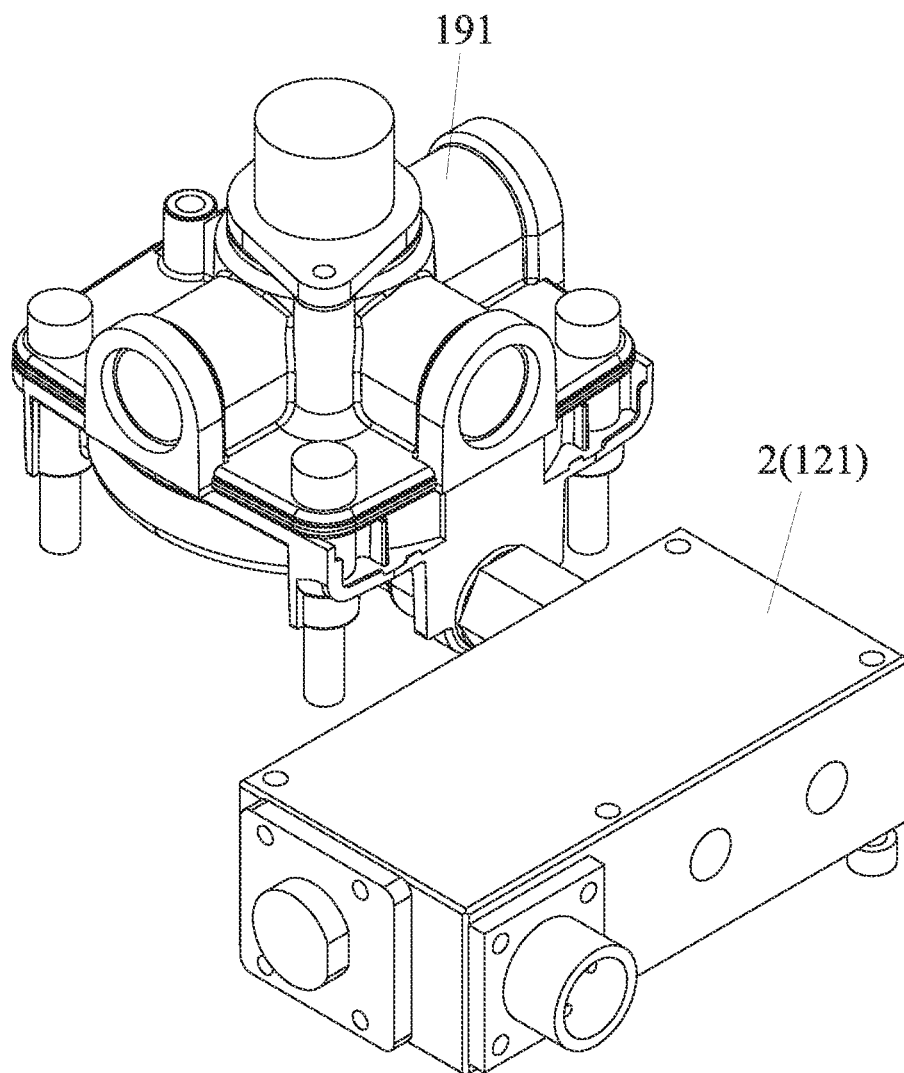
FIG. 12 is a perspective view illustrating the air brake electric control valve being connected to a relay valve.

In summary, the function of the air brake electric control valve 2 meets the requirements of the front axle air brake electric control valve 121 and the rear axle air brake electric control valve 121'. The output pressure of the air brake electric control valve 2 can be controlled by the first electric control unit 140. In addition, the air brake electric control valve 2 is configured as a force-balance type valve. Different input current (in the coil 321) generates different output pressure via the force balance unit 310. There is no need of a pressure sensor to obtain a feedback value. By merely controlling the current in the coil 321, the air brake electric control valve 2 is able to output desired pressure by virtue or the pressure-increasing, the pressure-maintaining and the pressure-release functions thereof. The air brake electric control valve 2 can be controlled in a simple way, is relatively inexpensive, and is prevented from the malfunctions commonly associated with a pressure sensor. A conventional air brake system can be easily retrofitted with the air brake electric control valve 2 according to the disclosure to become an electrically-controlled brake system. In the electric control air brake system 1 according to the disclosure, two air brake electric control valves 2 are integrated to serve as the electric control pressure regulator 120 (see FIG. 11, the two air brake electric control valves 2 respectively correspond to the front axle air brake electric control valve 121 and the rear axle air brake electric control valve 121'). The front axle brake cylinders 130 and the rear axle brake cylinders 170 can be simultaneously controlled by the electric control pressure regulator 120. However, a single air brake electric control valve 2 is able to solely control the front axle brake cylinders 130 or the rear axle brake cylinders 170 unassisted. Referring to FIG. 12, in an example, a single air brake electric control valve 2 which corresponds to the front axle air brake electric control valve 121 is connected to the front axle relay valve 191 to control the front axle brake cylinders 130. Similarly, a single air brake electric control valve 2 which corresponds to the rear axle air-brake electric control valve 121' may be connected to the rear axle relay valve 192 to control the rear axle brake cylinders 170.

It should be noted that, when the air brake electric control valve 2 malfunctions, the plug 330 can be manually removed for releasing the pressure in the air brake electric control valve 2 via the vent hole 251.

Figure 13:
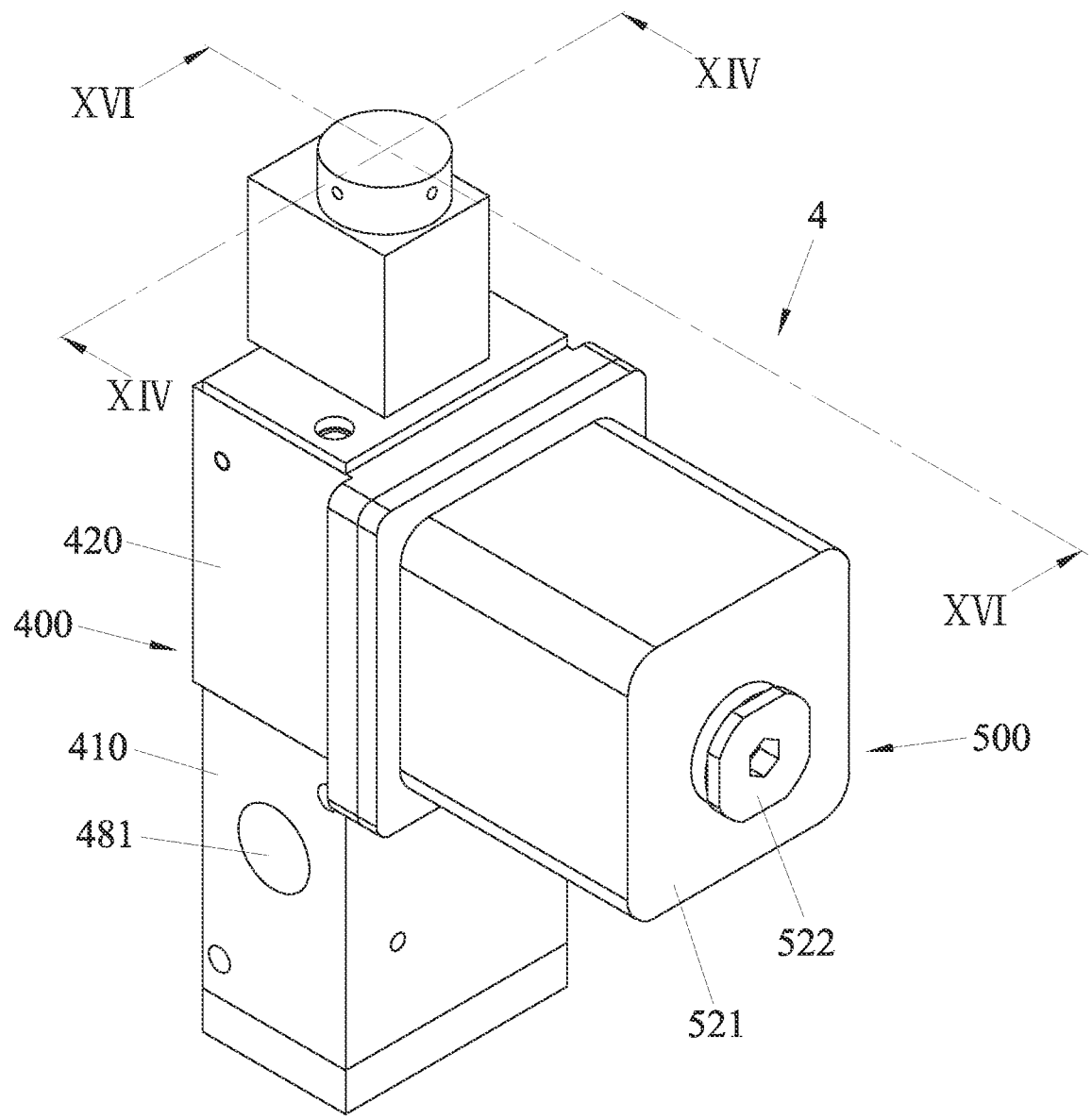
FIG. 13 is a perspective view of an air parking brake electric control valve.
Figure 14:
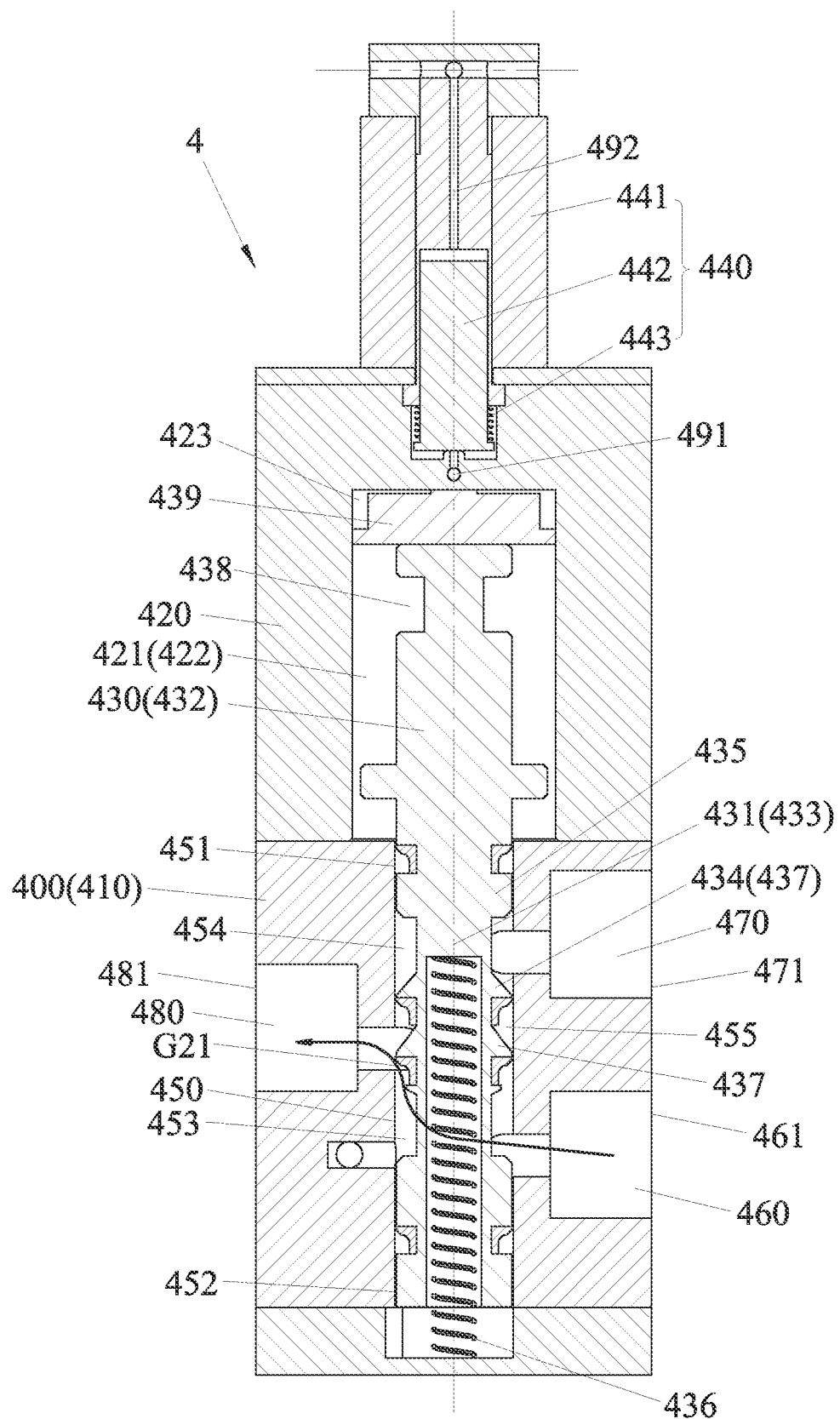
FIG. 14 is a sectional view taken along line XIV-XIV in FIG. 13, illustrating a valve core at a first action position.
Figure 16:
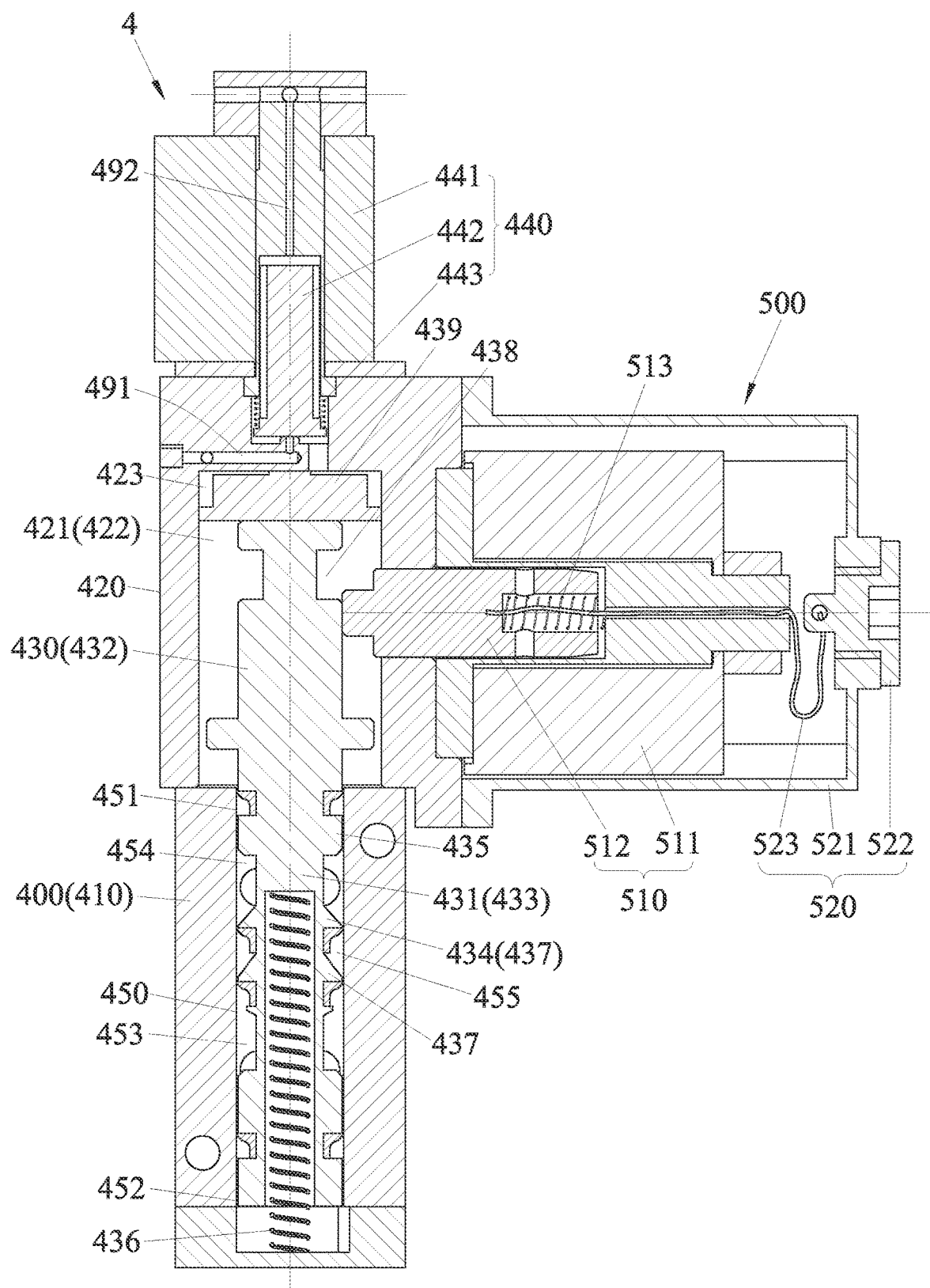
FIG. 16 is a sectional view taken along line XVI-XVI in FIG. 13, illustrating the air parking brake electric control valve at a release state.

Referring to FIGS. 13, 14 and 16, an air parking brake electric control valve 4 according to the disclosure is able to serve as the air parking brake electric control valve 160 of the electric control air brake system 1. The air parking brake electric control valve 4 includes an air valve unit 400 and a self-lock unit 500.

The air valve unit 400 includes a main valve body 410, an auxiliary valve body 420, a valve core 430 and a first electromagnetic assembly 440. The main valve body 410 has a first passage 450, a second passage 460 that transversely intersects the first passage 450, a third passage 470 that transversely intersects the first passage 450, and a fourth passage 480 that transversely intersects the first passage 450. The first passage 450 has an open end 451 and a closed end 452. The second passage 460 is disposed adjacent to the closed end 452 of the first passage 450, and has an end that communicates with the first passage 450, and an opposite end that forms an inlet 461. The third passage 470 is disposed adjacent to the open end 451 of the first passage 450, and has an end that communicates with the first passage 450, and an opposite end that forms a vent hole 471. The fourth passage 480 has an end that communicates with a portion of the first passage 450 between the second passage 460 and the third passage 470, and an opposite end that forms an outlet 481.

In an example, the air valve unit 400 may serve as the air valve unit 161 of the electric control air brake system 1, the self-lock unit 500 may serve as the self lock unit 162 of the electric control air brake system 1, and the inlet 461, the outlet 481 and the vent hole 471 may respectively serve as the inlet 163, the outlet 164 and the vent hole 165.

The auxiliary valve body 420 is connected to the main valve body 410, and defines a driving space 421 therein that communicates with the open end 451 of the first passage 450.

The valve core 430 is rod-shaped, and has an air guide section 431 that is disposed in the first passage 450, and a driving section 432 that is disposed in the driving space 421. The air guide section 431 has a rod body portion 433, a partition portion 434 that surrounds the rod body portion 433, and a blocking portion 435 that surrounds the rod body portion 433. The rod body portion 433 is embedded with a rod spring 436. The partition portion 434 divides the first passage 450 into a first chamber 453 that is proximate to the closed end 452 and that communicates with the second passage 460, and a second chamber 454 that is distal from the closed end 452 and that communicates with the third passage 470. The partition portion 434 includes two spaced-apart annular ribs 437. The annular ribs 437 cooperatively define a buffer chamber 455 therebetween that is located between the first chamber 453 and the second chamber 454. The blocking portion 435 is disposed at the open end 451 and serves to prevent fluid communication between the second chamber 454 and the driving space 421. The driving section 432 has an engaging groove 438 formed in an outer surrounding surface thereof, and a piston portion 439 at an end thereof opposite to the air guide section 431. The piston portion 439 divides the driving space 421 into the third chamber 422 that is proximate to the main valve body 410, and a fourth chamber 423 that is distal from the main valve body 410.

The first electromagnetic assembly 440 is disposed on an end of the auxiliary valve body 420 opposite to the main valve body 410, and includes a coil 441, a movable column 442 that is driven by the coil 441, and an electromagnetic spring 443 that abuts against the movable column 442. The movable column 442 is operable to move between an intake position and a vent position. The electromagnetic spring 443 resiliently biases the movable column 442 toward the vent position. The valve core 430 driven by the first electromagnetic assembly 440 to move between a first action position and a second action position. The rod spring 436 resiliently biases the valve core 430 toward the first action position.

Figure 15:
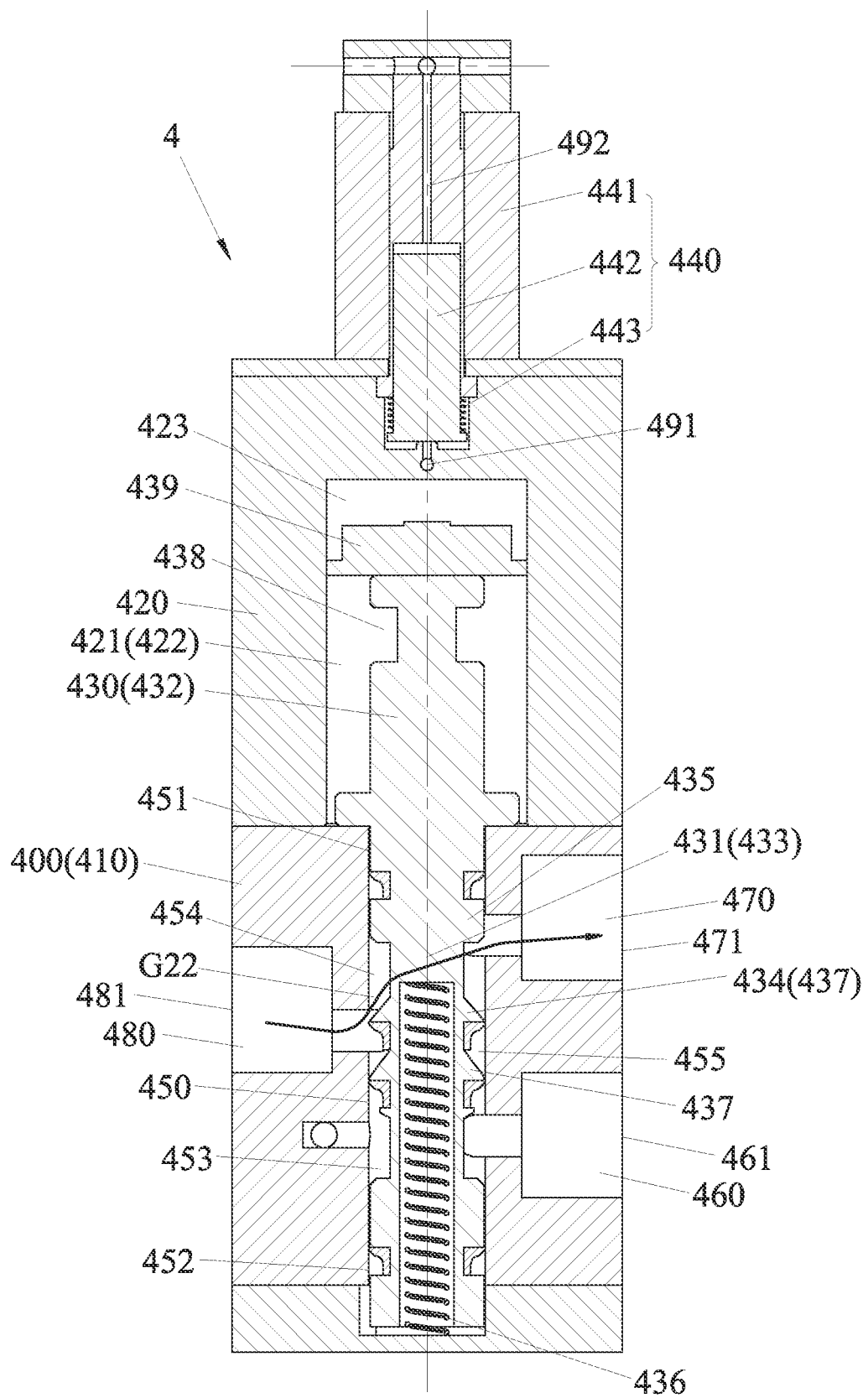
FIG. 15 is a view similar to FIG. 14, illustrating the valve core at a second action position.

When the valve core 430 is at the first action position (see FIG. 14), the partition portion 434 is distal from the closed end 452, and a first gap (G21) that communicates the first chamber 453 and the fourth passage 480 is formed between the partition portion 434 and the main valve body 410. When the valve core 430 is at the second action position (see FIG. 15), the partition portion 434 is proximate to the closed end 452, the first gap (G21) is closed, and a second gap (G22) that communicates the second chamber 454 and the fourth passage 480 is formed between the partition portion 434 and the main valve body 410.

When the movable column 442 of the first electromagnetic assembly 440 is at the intake position (see FIG. 18), the coil 441 is energized (activated by the third electric signal (S3)), and the movable column 442 is retracted relative to the coil 411 against the biasing action of the electromagnetic spring 443, is configured not to block an intake passage 491 that communicates the fourth chamber 423 with the first chamber 453, and is configured to block a vent passage 492 that communicates the fourth chamber 423 with the outside surrounding, such that the fourth chamber 423 expands to move the valve core 430 to the second action position against the biasing action of the rod spring 436. When the movable column 442 of the first electromagnetic assembly 440 is at the vent position (see FIGS. 16, 17 and 19), the coil 441 is de-energized, and the movable column 442 is biased by the electromagnetic spring 443 to project relative to the coil 441, is configured to block the intake passage 491, and is configured to not block a vent passage 492, such that the rod spring 436 biases the valve core 430 back to the first action position and that the fourth chamber 423 shrinks. FIG. 20 illustrates an example of the configuration of the intake passage 491 and the vent passage 492. However, one skilled in the art is able to design an equivalent passage structure, and the configuration of the intake passage 491 and the vent passage 492 is not limited to the example in FIG. 20. It should be noted that the intake passage 491 may communicate with an inner space of the rod body portion 433 to aid the biasing action of the rod spring 436.

The self-lock unit 500 is disposed on the auxiliary valve body 420, and includes a second electromagnetic assembly 510 and a proof assembly 520. The second electromagnetic assembly 510 includes a coil 511, a movable column 512 that is driven by the coil 511, and a self-lock spring 513 that abuts against the movable column 512. The movable column 512 of the second electromagnetic assembly 510 is operable to move between a release position and a lock position. When the movable column 512 of the second electromagnetic assembly 510 is at the release position (see FIGS. 16, 17 and 18), the movable column 512 is retracted relative to the coil 511 against the biasing action of the self lock spring 513, and is configured not to engage the engaging groove 438 of the valve core 430, so that the valve core 430 is movable between the first action position and the second action position. When the movable column 512 of the second electromagnetic assembly 510 is at the lock position (see FIG. 19), the movable column 512 is biased by the self-lock spring 513 to project relative to the coil 511 and to engage the engaging groove 438 of the valve core 430, so that the valve core 430 is kept at the second action position.

The proof assembly 520 includes an outer casing 521 that covers the second electromagnetic assembly 510, a bolt member 522 that is movably mounted to the outer casing 521, and a cord 523 that is connected between the bolt member 522 and the movable column 512 of the second electromagnetic assembly 510. Under normal circumstances, the cord 523 is loose, and would not affect the operation of the movable column 512 of the second electromagnetic assembly 510. When the air parking brake electric control valve 4 malfunctions during parking brake, the bolt member 522 can be manually separated from the outer casing 521 to pull the movable column 512 of the second electromagnetic assembly 510 via ole cord 523 for separating the movable column 512 from the valve core 430 so as to release the parking brake. The parking brake can be performed via operating the air parking brake manual valve 150.

Specifically, the air parking brake electric control valve 4 is switchable among a release state, a first phase state, a second phase state and a rock state. When a vehicle is traveling, the air parking brake electric control valve 4 should be in the release state. When a vehicle is parking, the air parking brake electric control valve 4 should be in the lock state. The first phase state and the second phase state are transition states during the switch between the release state and the lock state.

Referring to FIG. 16, when in the release state, the coil 441 of the first electromagnetic assembly 440 and the coil 511 of the second electromagnetic assembly 510 are not energized, the movable column 442 of the first electromagnetic assembly 440 is at the vent position, the valve core 430 is at the first action position, and the movable column 512 of the second electromagnetic assembly 510 is not aligned with the engaging groove 438 of the valve core 430 and is unable to engage the engaging groove 438 (substantially release position). The air entering via the inlet 461 sequentially flows through the second passage 460, the first chamber 453, the first gap (G21) and the fourth passage 480 to exit via the outlet 401 (see FIG. 14). As such, when there is no manual operation and when the air parking brake electric control valve 4 is at the release state, the rear axle brake cylinders 170 would not perform the brake function, and the vehicle travels freely.

During the switch from the release state to the lock state, the air parking brake electric control valve 4 is sequentially switched into the first phase state and then the second phase state.

Figure 17:
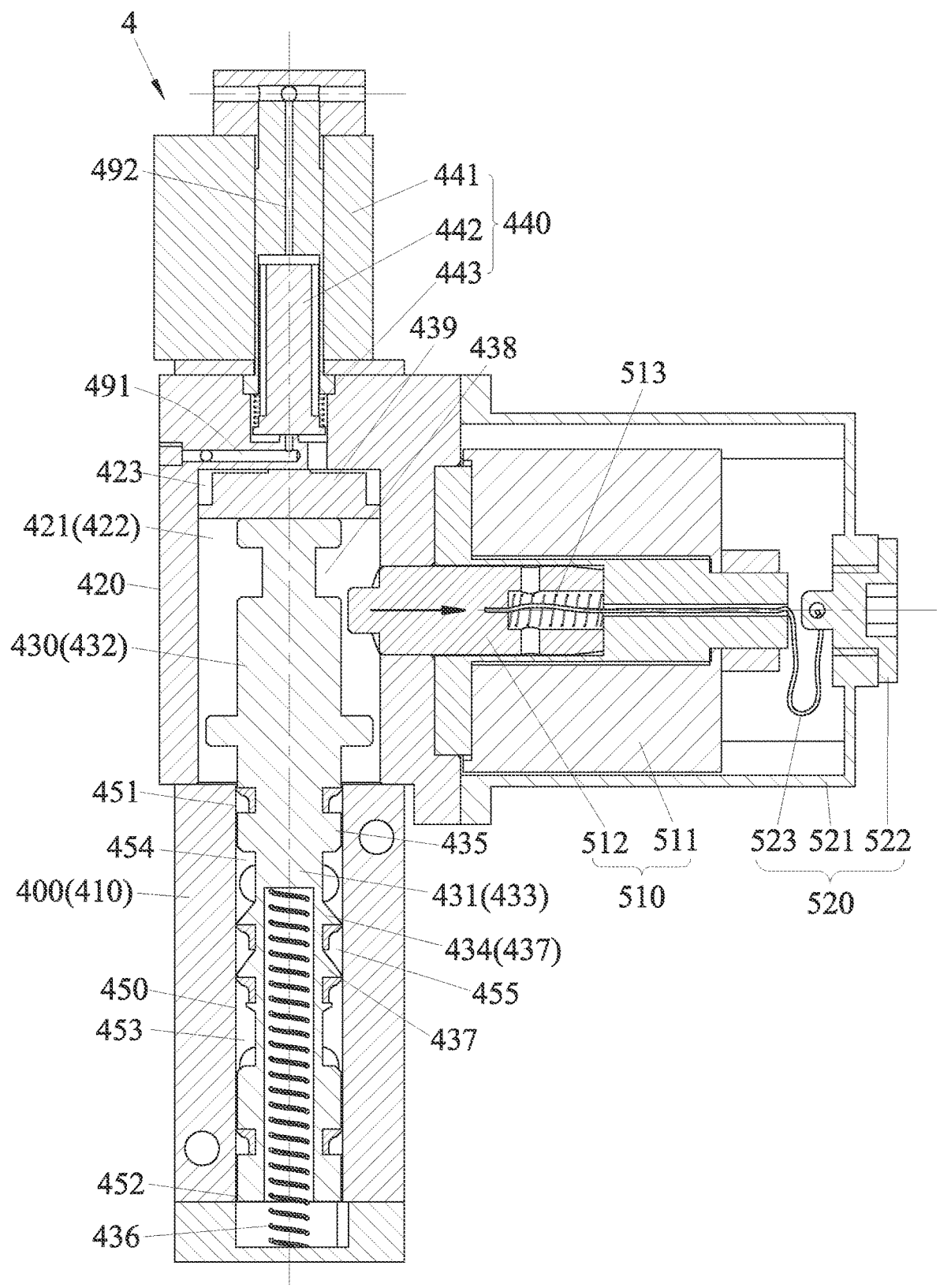
FIG. 17 is a view similar to FIG. 16, illustrating the air parking brake electric control valve at a first phase state.

Referring to FIG. 17, when in the first phase state, the coil 441 of the first electromagnetic assembly 440 is not energized, and the coil 511 of the second electromagnetic assembly 510 is energized. The movable column 442 of the first electromagnetic assembly 440 is at the vent position, the valve core 430 is at the first action position, and the movable column 512 of the second electromagnetic assembly 510 is at the release position. Since the coil 511 of the second electromagnetic assembly 510 is energized, the movable column 512 of the second electromagnetic assembly 510 is retracted relative to the coil 511 of the second electromagnetic assembly 510 against the biasing action of the self-lock spring 513. As such, there is no friction generated between the valve core 430 and the movable column 512 of the second electromagnetic assembly 510, and the movable column 512 of the second electromagnetic assembly 510 would not engage the engaging groove 430 of the valve core 430. When there is no manual operation and when the air parking brake electric control valve 4 is in the first phase state, the rear axle brake cylinders 170 would not perform the brake function, and the vehicle travels freely.

Figure 18:
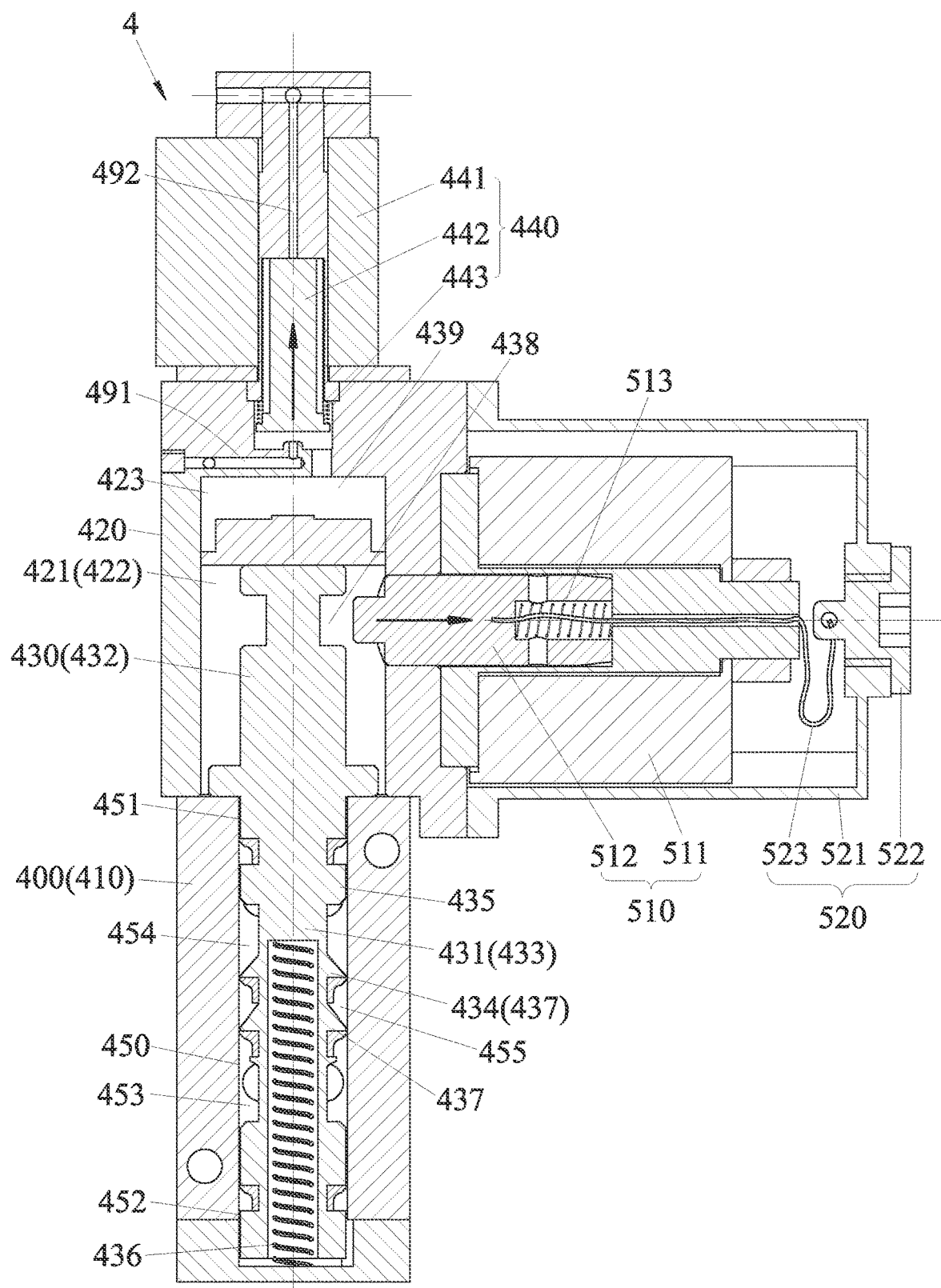
FIG. 18 is a view similar to FIG. 16, illustrating the air parking brake electric control valve at a second phase state.

Referring to FIG. 18, when in the second phase state, the coil 441 of the first electromagnetic assembly 440 and the coil 511 of the second electromagnetic assembly 510 are energized. The movable column 442 of the first electromagnetic assembly 440 is at the intake position, the valve core 430 is at the second action position, and the movable column 512 of the second electromagnetic assembly 510 is at the release position. Since the coil 511 of the second electromagnetic assembly 510 is energized, the movable column 512 of the second electromagnetic assembly 510 is retracted relative to the coil 511 of the second electromagnetic assembly 510 against the biasing action of the self-lock spring 513, and is configured to not engage the engaging. Groove 438 of the valve core 430. Since the valve core 430 is at the second action position, the air entering via the inlet 461 is prevented from flowing to the outlet 481, and the air at the outlet 481 is able to flow via the fourth passage 480, the second gap (G22), the second chamber 454, and the third passage 470 to the vent hole 471 (see FIG. 15). As such, regardless of whether or not there is manual operation, when the air parking brake electric control valve 4 is at the second phase state, the rear axle brake cylinders 170 would perform the brake function, and the vehicle is control led electrically to be kept stationary. It should be noted that the coil 441 of the first electromagnetic assembly 440 and the coil 511 of the second electromagnetic assembly 510 may consume considerable energy and generate considerable heat when the air parking brake electric control valve 4 is kept in the second phase state for a long period of time, so the air parking brake electric control valve 4 should be switched to the lock state for saving energy and for preventing the coil 441 of the first electromagnetic assembly 440 and the coil 511 of the second electromagnetic assembly 510 to burn out.

Figure 19:
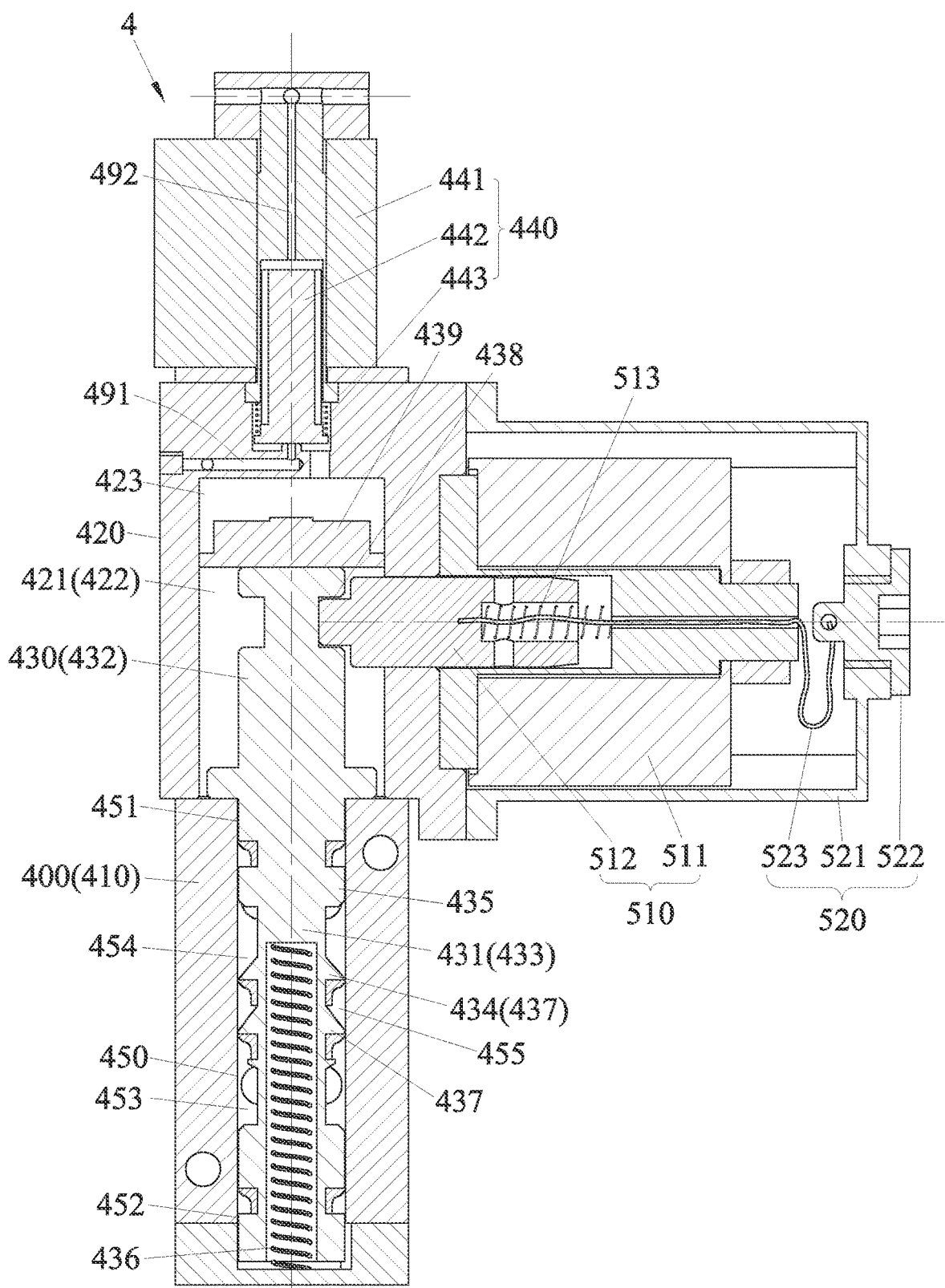
FIG. 19 is a view similar to FIG. 16, illustrating the air parking brake electric control valve at a lock state.
Figure 20:
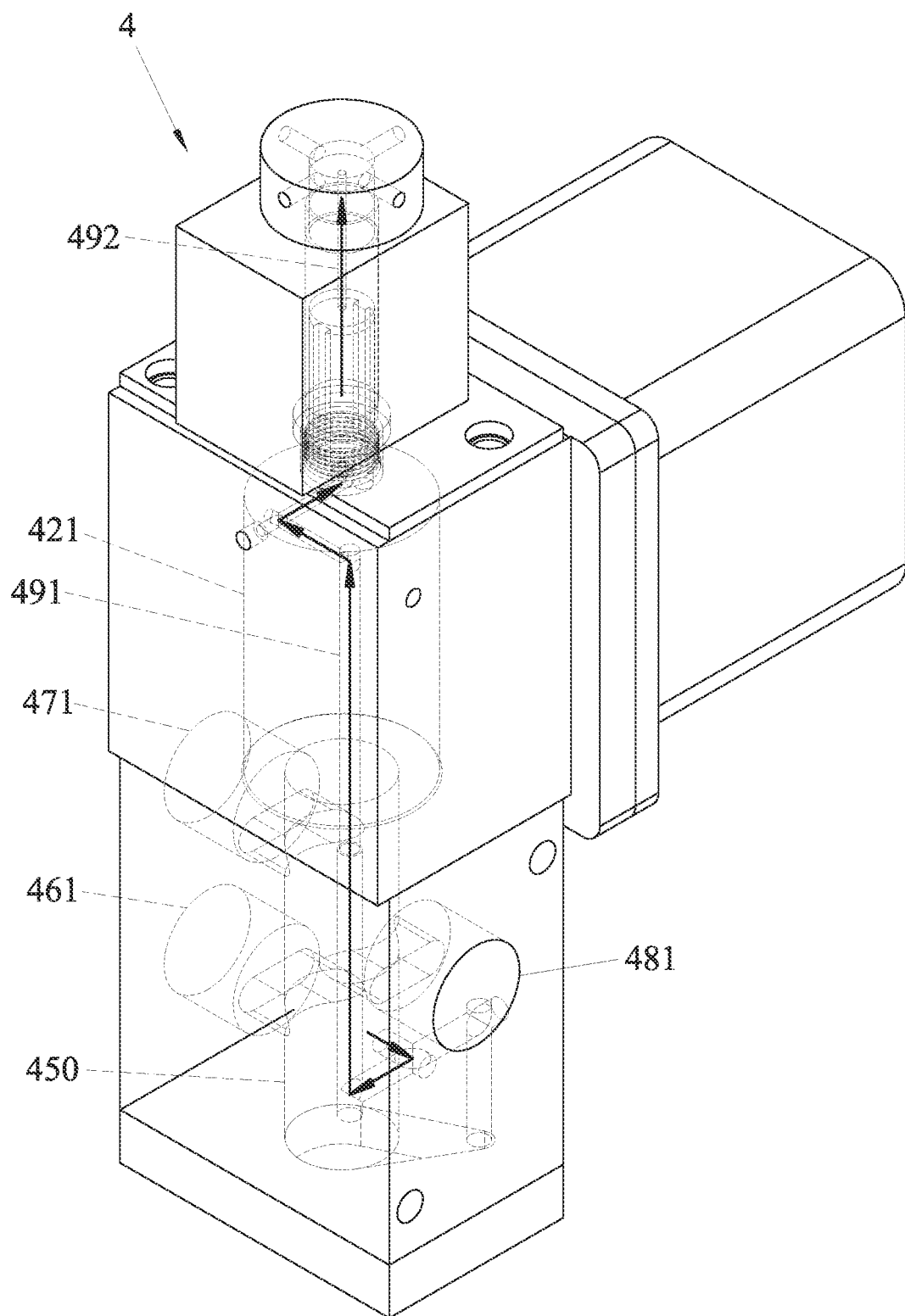
FIG. 20 is a perspective view of the air parking brake electric control valve, illustrating the configuration of an intake passage and a vent passage.

Referring to FIG. 19, when in the lock state, the coil 441 of the first electromagnetic assembly 440 and the coil 511 of the second electromagnetic assembly 510 are not energized. The movable column 442 of the first electromagnetic assembly 440 is at the vent position, the valve core 430 is at the second action position, and the movable column 512 of the second electromagnetic assembly 510 is biased by the self-lock spring 513 to engage the engaging groove 438 of the valve core 430. Since the valve core 430 is at the second action position, the air entering via the inlet 461 is prevented from flowing to the outlet 481, and the air at the outlet 481 is able to flow via the fourth passage 480, the second gap (G22), the second chamber 454, and the third passage 470 to the vent hole 471 (see FIG. 15). As such, regardless of whether or not there is manual operation, when the air parking brake electric control valve 4 is at the lock state, the rear axle brake cylinders 170 would perform the brake function, and the vehicle is controlled electrically to be kept stationary. It should be noted that the coil 441 of the first electromagnetic assembly 440 and the coil 511 of the second electromagnetic assembly 510 may not consume energy and may not burn out when the air parking brake electric control valve 4 is in the lock state.

During the switch from the lock state to the release state, the air parking brake electric control valve 4 is sequentially switched into the second phase state and then the first phase state.

Referring to FIG. 18, when in the second phase state, the movable column 442 of the first electromagnetic assembly 440 is at the intake position, the valve core 430 is at the second action position, and the movable column 512 of the second electromagnetic assembly 510 is at the release position. At this time, since the fourth chamber 423 is filled with compressed air, the movable column 512 of the second electromagnetic assembly 510 can be easily separated from the engaging groove 438 of the valve core 430. If the coil 511 of the second electromagnetic assembly 510 is directly energized without switching the air parking brake electric control valve 4 into the second phase state (i.e., without energizing the coil 441 of the first electromagnetic assembly 440), the movable column 512 of the second electromagnetic assembly 510 may not be easily separated from the engaging groove 438 of the valve core 430.

Referring to FIGS. 16 and 17, after the movable column 512 of the second electromagnetic assembly 510 is separated from the engaging groove 438 of the valve core 430, the coil 441 of the first electromagnetic assembly 440 is first de-energized so that the air parking brake electric control valve 4 is temporarily switched into the first phase state, and the coil 511 of the second electromagnetic assembly 510 is then de-energized so that the air parking brake electric control valve 4 is switched into the release state. It should be noted that the coil 441 of the first electromagnetic assembly 440 and the coil 511 of the second electromagnetic assembly 510 may not consume energy and may not burn out when the air parking brake electric control valve 4 is in the release state since the coil 441 of the first electromagnetic assembly 440 and the coil 511 of the second electromagnetic assembly 510 are not energized.

The air parking brake electric control valve 4 is operable to switch between the release state and the lock state by the second electric control unit 180. When the vehicle is parking, if the parking brake function is not manually activated, the second electric control unit 180 would electrically activate the parking brake function. A conventional air brake system can be easily retrofitted with the air parking brake electric control valve 4 so as to become an electrically-controlled air brake system. In an example, the air parking brake electric control valve 4 is an assembly of commercial normally-open three-port two-position valves and the self-lock unit 500, which is reliable and inexpensive.

In summary, the air brake electric control valve 2 and the air parking brake electric control valve 4 according to the disclosure are able to electrically control the electric control air brake system 1. In addition, since the air brake electric control valve 2 and the air parking brake electric control valve 4 work without a pressure sensor, the air brake electric control valve 2 and the air parking brake electric control valve 4 according to the disclosure are relatively inexpensive, and are prevented from the malfunctions commonly associated with a pressure sensor. A conventional air brake system can be easily retrofitted with the air brake electric control valve 2 and/or the air parking brake electric control valve 4 so as to become an electrically-controlled air brake system.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An air brake electric control valve comprising:
   a valve body having a first passage, a second passage that transversely intersects said first passage, a third passage that transversely intersects said first passage, and a fourth passage that transversely intersects said first passage, said first passage having an end that forms a first inlet, said second passage having an end that communicates with another end of said first passage opposite to said first inlet, and an opposite end that forms a vent hole, said third passage being disposed adjacent to said first inlet, and having an end that communicates with said passage, and an opposite end that forms an outlet, said fourth passage being disposed adjacent to said second passage, and having an end that communicates with said first passage, and an opposite end that forms a second inlet, said first passage further having an intermediate section that is located between said third passage and said fourth passage;
   a shuttle member disposed at an intersection between said first passage and said third passage;
   a force balance unit including an air guide member that extends from the intersection between said first passage and said second passage toward the intersection between said first passage and said fourth passage, and an air guide spring that surrounds said air guide member, said air guide member further having a through hole that extends in the extending direction of said first passage, said air guide member being operable to move between a first air guide position and a second air guide position; said air guide spring resiliently biasing said air guide member toward the second air guide position; and
   an electromagnetic urge unit disposed at the another end of said first passage opposite to said first inlet, said electromagnetic urge unit having a coil, a movable column that is driven by said coil, and an electromagnetic spring that abuts against said movable column, said movable column being operable to move between an urging position and a retracted position, said electromagnetic spring resiliently biasing said movable column toward the retracted position;
   wherein, when said movable column is at the urging position, said movable column is moved against the biasing action of said electromagnetic spring to project out of said coil, and pushes said air guide member with an urge force such that said through hole of said air guide member is blocked and that said air guide member is moved to the first air guide position against the biasing action of said air guide spring; and
   wherein, when said movable column is at the retracted position, said movable column is biased by said electromagnetic spring to retract into said coil, and a gap is formed between said movable column and said air guide member such that said intermediate section is in fluid communication with said second passage via said through hole of said air guide member and said gap and that said air guide member is biased to move to the second air guide position by said air guide spring.

2. The air brake electric control valve as claimed in claim 1, further comprising a plug, said valve body further having a fifth passage that transversely intersects said first passage, said fifth passage having an end that communicates with the intersection between said first passage and said third passage, and an opposite end that serves as a vent hole and that is blocked by said plug.

* * * * *